United States Patent [19]

Meister

[11] Patent Number: 5,138,007

[45] Date of Patent: Aug. 11, 1992

[54] PROCESS FOR MAKING GRAFT COPOLYMERS FROM LIGNIN AND VINYL MONOMERS

[76] Inventor: John J. Meister, 31675 Westlady Rd., Beverly Hills, Mich. 48010-5624

[21] Appl. No.: 479,839

[22] Filed: Feb. 14, 1990

Related U.S. Application Data

[63] Continuation-in-part of Ser. No. 286,344, Dec. 19, 1988, Pat. No. 4,931,527, and a continuation-in-part of Ser. No. 286,534, Dec. 19, 1988, Pat. No. 4,940,764.

[51] Int. Cl.$^5$ .............................................. C08H 5/02
[52] U.S. Cl. ...................................... 527/400; 527/403
[58] Field of Search ................. 527/400, 403; 530/500

[56] References Cited

U.S. PATENT DOCUMENTS

| | | | |
|---|---|---|---|
| 4,687,828 | 8/1987 | Meister et al. | 527/400 |
| 4,871,825 | 10/1989 | Lin | 527/400 |
| 4,889,902 | 12/1989 | Meister | 527/400 |
| 4,931,527 | 6/1990 | Meister | 527/400 |
| 4,940,764 | 7/1990 | Meister | 527/400 |
| 4,988,576 | 1/1991 | Lin et al. | 527/400 |

Primary Examiner—Nathan M. Nutter

[57] ABSTRACT

The invention provides a series of methods for synthesizing a lignin graft copolymer or modifying the surface of a wood fiber or pulp and to provide a spectrum of reagents to use in the processes for preparing the lignin graft copolymer, grafted wood, grafted wood fiber, or grafted pulp and to provide a method of boosting or enhancing polymer molecular weights during polymerization reactions.

In accordance with the present invention, to the lignin macromolecule, possibly to the aromatic ring of the oxyphenylpropene moiety, is grafted 1) repeating units of 1-(pendant group)ethylene:

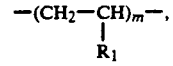

2) a combination of randomly occurring repeating units of 1-(pendant group)ethylene with 1-(alternate pendant group)ethylene:

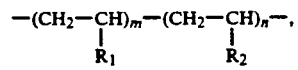

3) a combination of randomly occurring repeating units of 1-methyl-1-(pendant group)ethylene with 1-(alternate pendant group)ethylene:

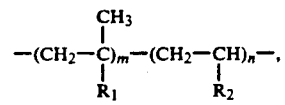

or 4) a combination of randomly occurring repeating units of 1-methyl-1-(pendant group)ethylene with 1-methyl-1-(alternate pendant group)ethylene:

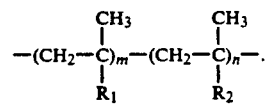

In these formulas, m and n are integers varying from 1 to 300,000. $R_1$ and $R_2$ are organic functional groups which do not interfere with free radical polymerization, and the structures presented represent typical polymer or random-sequence, copolymer sidechains attached to lignin by the process of this invention.

26 Claims, No Drawings

PROCESS FOR MAKING GRAFT COPOLYMERS FROM LIGNIN AND VINYL MONOMERS

RELATED APPLICATIONS

The subject application is a continuation-in-part of co-pending U.S. application Ser. No. 286,344 filed Dec. 19, 1988 issued as U.S. Pat. No. 4,931,527 on Jun. 5, 1990 and 286,534 filed on Dec. 19, 1988 issued as U.S. Pat. No. 4,940,764 on Jul. 10, 1990.

FIELD OF THE INVENTION

The present invention relates to a process for making graft copolymers of lignin by attaching to the lignin a sidechain of polymerized ethene monomer.

BACKGROUND AND SUMMARY OF THE INVENTION

In 1988, the United States produced a larger volume of polymers and plastics than the entire annual production volume of steel, aluminum, and copper combined. Polymers have become the most common material in our daily lives and are critical items of commerce, industry, and technology. Plastics are a subset of all polymers and have the following characteristics: 1) high molecular weight molecules, 2) the molecules are composed of smaller units, called the repeat unit, which is chemically bound to other repeat units to make up the molecule, 3) the solid is often above its glass transition temperature when at room temperature, and 4) the solid is extrudible at temperatures above its application temperature and is thus a thermoplastic.

Methods of making polymers are very important for industrial chemical synthesis processes and industrial materials. However, most previous and current synthesis processes make homopolymers of ethene, petroleum-based monomers. These homopolymers contain only one repeat unit in the molecule. As these oil-based monomers become more expensive and more scarce, the polymers we use will have to be made from other natural products.

The three natural polymers available to form commercial plastics are cellulose, lignin, and starch. Methods to create sidechains on cellulose and starch by free radical polymerization are known. But, these methods fail to attach sidechains to lignin because the reactions which produce reactive sites on anhydroglucose chains (cellulose or starch) are not powerful enough to do the same thing on lignin.

In U.S. Pat. No. 4,687,828, entitled WATER SOLUBLE GRAFT COPOLYMERS OF LIGNIN-(2-PROPENAMIDE)-(SODIUM 2,2-DIMETHYL-3-IMINO-4-OXOHEX-5-ENE-1-SULFONATE), METHODS OF MAKING THE SAME AND USES THEREFOR, Meister and Patil described methods for preparing a specific copolymer of lignin and claimed a product grafted lignin copolymer so produced. The method of the 828 patent and the lignin copolymer produced thereby differ from the instant invention. The product of the instant invention is new and has been produced by a new, unique method.

Some common products which contain lignin are mechanical pulp, thermomechanical pulp, wood, or wood fiber. However, these lignin containing materials have hydrophilic surfaces which are incompatible with hydrophobic materials such as plastics. Hydrophilic means that a material is "water seeking or water preferring". The chemical structure of a hydrophilic material produces a lower Gibbs free energy (lower total energy) when the material interacts with, imbibes, or wets with water. Hydrophilic materials: 1) have a contact angle of less than 90° with water (wet), 2) may dissolve in water, 3) may imbibe water, and 4) may be hydroscopic (prone to extract water from humid air). Hydrophobic means water repelled. Hydrophobic materials will increase total system energy when placed in contact with water. Thus, these materials are minimally soluble, if not insoluble, in water; have contact angles above 90° with water (non-wetting); and tend to repel water.

To reinforce a hydrophobic plastic with a fiber like thermomechanical pulp and wood, the fiber surface must be made compatible with the plastic. Otherwise, plastic and pulp won't bind to one another and there will be no reinforcing effect from adding the pulp to the plastic. The use of lignin as a basic building block to form plastics will resolve an important disposal problem, and accordingly have a significant positive impact on the environment, as will be understood from the following discussion concerning the production and disposal of lignin during wood/cellulose processing.

To obtain cellulose from natural materials containing lignocellulose, the material is subjected to a chemical treatment which solubilizes the lignin to a degree which will allow the cellulose to be separated in the form of fibers. The dissolved lignin constitutes between about 25 to 45% of the lignocellulose, the amount depending on the extraction process used, the extent of the solubilization, and the sources of the lignocellulose undergoing separation. The lignocellulose used in most processes is usually wood trees and the trees used to supply the lignin are usually classified as soft and hard woods.

Lignin has such a limited commercial utility that its disposal has become a source of serious ecological and economic problems. In the past, most of the lignin solutions have been sewered or pumped directly into rivers and streams, destroying the ecological balance of the environment. Small amounts of lignin are used as drilling muds or are calcined to yield adsorbent, activated carbons. Much of it is concentrated by evaporation to a lower water content and sprayed into a furnace to burn the lignin, and from the ashes thus produced, a partial amount of the inorganic chemicals used in the process is recovered. The amount of lignin used in these applications represents a very small fraction of the millions of tons of lignin generated yearly as a by-product of the pulp and paper industry. Stringent anti-pollution regulations have obligated this industry to commit about one-half billion dollars a year for pollution control, the cost of which led to severe economic problems which resulted on the assumption of these expenditures by the industry. The burning of the lignin for its fuel value and for the recovery of inorganic minerals is insufficient to recover the cost of the pollution control.

Eventually, the total cost of producing cellulose products from lignocellulose materials will be borne by the ultimate consumer in the form of higher prices for the products, unless substantial credit can be obtained by upgrading or modifying the lignin through a high volume utilization. Lignin can be recovered from pulping operations in the form of brown amorphous powder, if it is dried to eliminate substantial quantities of water or extraction solvent.

The lignin is obtained as a by-product of any of the processes used industrially to obtain cellulose from lignocellulose compositions. In the sulfite processes, sulfonate moieties are attached to coniferyl units in the lignin and act as solvating groups to produce a water-soluble lignin; the water-insoluble form can be produced from these soluble lignins by acidification or by other chemical treatments. The alkaline process for preparing cellulose is more efficient than the sulfite process and produces higher yields of cellulose fiber. In the alkaline process, liquors containing either sodium hydroxide or a mixture of sodium hydroxide and sodium sulfide are used to produce "alkali lignin" as a lignin salt which is soluble in the pulping liquor, from which it can be recovered conveniently by acid precipitation; the lignin isolated depends upon the specific conditions which the lignin is obtained. Thus, if it is precipitated at a pH in the range of 9.5 to 10.0, a lignin salt is obtained, but if it is precipitated at a low pH, below 7.0, and washed thoroughly with water, a free lignin is obtained. By adjustment of the pH, fractions of various molecular weights can also be obtained and isolated. Most of the paper pulp, of the order of 90% or more, is produced in this country by the Kraft process, with liquors containing sodium sulfide. Unfortunately, sodium sulfide simultaneously produces dimethyl sulfide and methyl mercaptan. To reduce or overcome this odor problem, some pulps are manufactured by the peroxide process, which is based on hydrogen peroxide adjusted to specific pH values. Minor amounts of lignin are obtained at the present time, from the peroxide processes, but the volume is expected to increase.

Lignin [8068-00-6] is derived from woody plants. In fact, after cellulose, it is the principal constituent of the woody structure of higher plants. Lignin, which makes up about 25% of the weight of dry wood, acts as a cementing agent to bind the matrix of cellulose fibers together into a rigid woody structure. See *Biochemistry* by A. L. Lehninger (Worth Publishers, 1970).

Moreover, lignin sources are abundant. Although the wood and bark waste from the lumber industry and wastes from agricultural operations could provide extremely large quantities of lignin, perhaps the most accessible, albeit smaller, source is the pulp and paper industry. For example, in 1978, it has been estimated that the U.S. chemical-pulp industry produced $1.55 \times 10^7$ tons of alkali lignin and $1.6 \times 10^6$ tons of lignosulfonic acids. See *Encyclopedia of Chemical Technology*, vol. 14 (Kirk-Othmer, 1981).

In general, the molecular structure of the repeating lignin units and the appropriate numbering thereof is as follows:

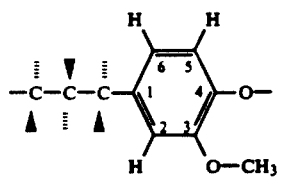

It appears that, regardless of origin, lignin [8068-00-6] is a complex, oxyphenylpropene polymer. In the natural state, lignin is a highly branched and partially crosslinked polymer. However, there appears to be some structural variation in branching depending upon whether the lignin is derived from coniferous or deciduous species or from bark, cambium, sapwood or heartwood. During recovery, the lignin is chemically altered and is available in relatively pure form as a derivative having a molecular weight of about 1,000 to 150,000. Of the lignins which may be used according to the present invention, there may be mentioned alkali lignins, HCl lignins, acid lignins, Klassen lignins, solvent-extracted lignins, steam-explosion lignins, milled wood lignins (MWL) and 1,4-dioxane lignins, for example, with each lignin named according to the method of recovery used to obtain it. Methods for recovering lignin are the alkali process, the sulfite process, ball milling, enzymatic release, hydrochloric acid digestion, and organic solvent extraction. Alkali lignins are produced by the kraft and soda methods for wood pulping. They have low sulfur content (<1.6 weight percent), sulfur contamination present as thioether linkages, and are nonionic polymers of low (2,000 to 15,000) molecular weight. Alkali lignins are tan, brown or black powders. When free of metal cations, such as sodium or potassium, alkali lignins are water-insoluble materials and are commonly called "free acid" or "acid free" lignin. When containing metal cations, such as sodium or potassium, the alkali lignins are slightly water soluble materials which increase in water solubility as the pH increases from 7 toward 14 and become completely soluble in 5 weight percent aqueous sodium hydroxide solutions. Approximately 20 million tons of kraft lignin are produced in the United States each year.

The sulfite process for separating lignin from plant biomass produces a class of lignin derivatives called lignosulfonates. Lignosulfonates contain approximately 6.5 weight percent sulfur present as ionic sulfonate groups. These materials have molecular weights up to 150,000 and are very water-soluble. Lignosulfonates are used in resource recovery as cement grouting agents, sacrificial agents in EOR, and thinning agents in drilling muds. The material is therefore directly utilized in energy recovery.

Milled wood lignin (MWL) is produced by grinding wood in a rotary or vibratory ball mill. Lignin can be extracted from the resulting powder using solvents such as methylbenzene or 1,4-dioxacyclohexane. Milling only releases 60 weight percent or less of the lignin in wood, disrupts the morphology of lignin in wood, and may cause the formation of some functional groups on the produced lignin. Despite these limitations, milling appears to be an effective way of recovering lignin from plants with only slight alteration. Enzymes which hydrolyze polysaccharides can be used to digest plant fiber and release lignin. After digestion, the lignin is solubilized in ethanol. Extensive analytical studies support the idea that enzymatically produced lignin has undergone no major modification in removal from plant material. Milling and enzyme release are not commercial methods to recover lignin at present, but the commercialization of ethanol from biomass processes may make enzyme lignin available in large quantities.

Acid hydrolysis of the polysaccharide portion of wood will release lignin but also causes major condensation reactions in the product. These reactions can be minimized by using 41 wt. percent hydrochloric acid in place of other mineral acids but some condensation reactions still occur. This is not an effective method by which to obtain unaltered lignin. On the other hand, lignin can be solvent extracted from wood at temperature of 175° C. using solvent mixtures such as 50/50 by volume water/1,4-dioxacyclohexane. Changes in lignin under these conditions appear to be minor. All of these lignins can be used as raw materials for graft copolymerization and none is automatically preferred over the others. Choice of lignin to be used in the reaction is made on the basis of availability, cost, and the properties desired in the final copolymer. When the product to be made is to have high molecular weight, a high molecular weight lignin is usually chosen as a starting material. If the product to be made is to have low molecular weight, a low molecular weight lignin is usually chosen as a starting material. If the product to be made is to be a highly ionic, conducting copolymer; a highly ionic, conducting lignin such as a lignosulfonate is usually chosen as a starting material. If the product to be made is to be a non-ionic thermoplastic, a non-ionic lignin is usually chosen as a starting material. Rules such as these are general indications of how to choose a lignin for use in the grafting reaction and are the technical underpinning by which the examples, to be shown later, are designed.

The aromatic ring of a lignin repeat unit is often alkoxy substituted, as shown in the structure above, and the propene group often has a hydroxyl group attached in place of one hydrogen. Alkyl groups appear on some of the aromatic groups of the polymer and sulfur may be chemically bound to parts of the polymer, though few, if any, sulfonate groups occur.

Bonding between repeat units in alkali lignin is complex and involves carbon-carbon bonds between aromatic and/or alkyl carbons as well as ether bonds between aromatic and/or alkyl carbons. Labile hydrogens exist in the material and may be replaced by metal cations, such as sodium, potassium, calcium, or ammonium ions, to form alkali lignin salts. Alkali lignins are readily identified by method of production and are a familiar class of compounds to those versed in the paper making art. Steam explosion lignins are prepared from steam explosion pulp by any of the lignin extraction methods described previously. Steam explosion pulp is made by heating wood to a temperature at which water would boil if exposed to conditions which prevail in the next stage of the production process. The wood is then thrust into this "next stage" and the spontaneous formation of steam bursts the wood and produces a pulp.

Lignins are polymeric substances composed of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as by-products are thus one of the main sources of lignins. While there is some variation in the chemical structure of lignin, depending upon the plant from which lignin is obtained, place where the plant is grown, and also upon the method used in recovery or isolation of the lignin from the plant tissue, the basic structure and properties of the lignins are similar, all containing the alkane-substituted, phenolic groups. Thus, lignins obtained by any method or from any source may be used in this reaction as long as the lignin is in a form: 1) soluble in an aqueous alkaline medium or other solvent or 2) suspendable in emulsion, suspension, or neat polymerization reaction.

Since the lignins separated from the plant may be chemically altered somewhat from that found in the plant, the term "lignins", as used herein, means lignin of or from the lignin containing materials mentioned above. Lignin products may be products obtained upon separation from the cellulose or recovered from the plant. In the sulfite pulping process, the lignocellulosic material is digested with a bi-sulfite or sulfite resulting in the sulfonation of the lignins. In other methods of the recovery or separation of the lignins from the plant, the lignins may not be sulfonated but may be chemically altered somewhat in some other manner. For example, in residual pulping liquors obtained in the sulfate and other alkaline pulping processes, the lignins are present as alkaline metal salts dissolved in the alkaline aqueous liquor. "Hydrolysis lignin" obtained from the hydrolysis of lignocellulosic materials in the manufacture of sugar is likewise altered somewhat from that found in the plant. Also the lignin products such as a residual pulping liquor may be subjected to various treatments such as, for example, acid, alkaline or heat treatments or reacted with other chemicals which may further alter somewhat the lignin constituents. The lignins remain operative for this process as long as the treatment is not so severe as to destroy the basic polymeric structure or substantially decrease the phenolic hydroxyl content of the lignin.

The residual pulping liquors, or the lignin-containing product obtained in the separation or recovery of lignins from the plant, will generally contain lignins of various molecular weights varying from less than 1,000 to over 100,000. These liquors also may contain other constituents besides lignins. For example, in the sulfite pulping process, the spent sulfite liquor contains lignosulfonates which may be present as salts of cations, such as magnesium, calcium, ammonium, sodium and other cations which may have been present during the sulfonation of the lignin. The spent sulfite liquor generally contains only about 40 to 60 weight percent of an oven dried basis of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Alkaline treatment of the lignins has a tendency to increase the phenolic hydroxyl content and also to enhance the flocculating properties of the final product under alkaline conditions.

Treatments of lignin by high-energy, ionizing radiation such as x-rays or gamma rays can connect sidechains to lignin but these reactions create crosslinked solids that lack thermoplastic properties and can not be dissolved. As will be shown below, a method has now been developed which allows ethene monomers to be attached to lignin and lignin thermoplastics to be made. This invention provides a broad spectrum of soluble, extrudeable copolymers and methods for making said copolymers, which improves upon prior methods. See Tables 1 and 2 below.

The invention provides a series of methods for synthesizing a lignin graft copolymer or modifying the surface of a wood fiber or pulp and to provide a spectrum of reagents to use in the processes for preparing the lignin graft copolymer, grafted wood, grafted wood fiber, or grafted pulp and to provide a method of boosting or enhancing polymer molecular weights during polymerization reactions.

In accordance with the present invention, to the lignin macromolecule, possibly to the aromatic ring of the oxyphenylpropene moiety, is grafted 1) repeating units of 1-(pendant group)ethylene:

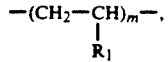

2) a combination of randomly occurring repeating units of 1-(pendant group)ethylene with 1-(alternate pendant group)ethylene:

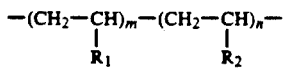

3) a combination of randomly occurring repeating units of 1-methyl-1-(pendant group)ethylene with 1-(alternate pendant group)ethylene:

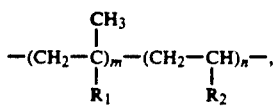

or 4) a combination of randomly occurring repeating units of 1-methyl-1-(pendant group)ethylene with 1-methyl-1-(alternate pendant group)ethylene:

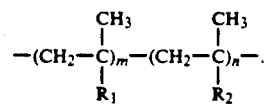

In these formulas, m and n are integers varying from 1 to 300,000. $R^1$ 1 and $R^2$ are organic functional groups which do not interfere with free radical polymerization, and the structures presented represent typical polymer or random-sequence, copolymer sidechains attached to lignin by the process of this invention.

The method of preparing a copolymer of lignin basically comprises:

1) providing an oxygen free environment;
2) forming a reaction mixture of:
   a) a lignin source
   b) a redox initiator
   c) a halide salt
   d) at least one monomer selected from the group of $CH_2{:}CHR_1$ and $CH_2{:}CHR_2$, as described hereinabove.

The objectives of the present invention include: 1) provide new copolymers containing lignin as the backbone component with a side chain or chains formed from a vinyl monomer; and 2) methods for synthesizing lignin copolymers having vinyl monomer side chain or chains.

Accordingly, it is an object of the present invention to provide a series of methods for synthesizing a lignin graft copolymer or modifying the surface of a wood fiber or pulp. It is also an object of the present invention to provide a spectrum of reagents to use in the processes for preparing the lignin graft copolymer, grafted wood, grafted wood fiber, or grafted pulp. Further, it is also an object of the present invention to provide a method of boosting or enhancing polymer molecular weights during polymerization reactions.

DETAILED DESCRIPTION OF THE PREFERRED EMBODIMENTS

Typical monomers that can be used to add a side chain to lignin are those with the general structure:

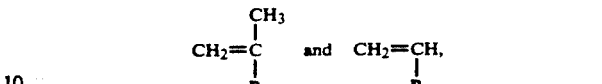

where $R_1$ and $R_2$ are organic or inorganic functional groups which do not interfere with free radical polymerization. Alternatively, the reaction can be run with the above monomers and some amount of a diethenyl compound,

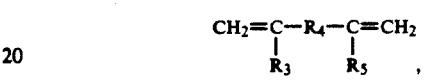

where $R_3$, $R_4$ and $R_5$ are organic or inorganic functional groups which do not interfere with free radical polymerization. The diethenyl compound will cause crosslinking of grafted molecules during the polymerization and, at low concentrations, will produce a higher molecular weight copolymer. At high concentration of diethenyl compound, a crosslinked solid will be produced by the reaction. These monomers are reacted with lignin to create a two part molecule such that the central lignin network has a molecular weight of about 1,000 to 150,000 and the total number of random units in the grafted side chain or chains is in the range of 1 to 300,000 units, such that the total copolymer molecular weight is in the range of 15,000 to 30,000,000.

DETAILED DESCRIPTION OF THE GENERAL PROCESS

In accordance with the present invention, to the lignin macromolecule, possibly to the aromatic ring of he oxyphenylpropene moiety, is grafted 1) repeating units of 1-(pendant group)ethylene:

2) a combination of randomly occurring repeating units of 1-(pendant group) ethylene with 1-(alternate pendant group)ethylene:

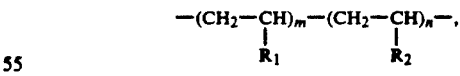

3) a combination of randomly occurring repeating units of 1-methyl-1-(pendant group)ethylene with 1-(alternate pendant group ethylene:

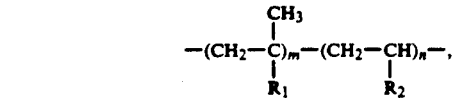

or 4) a combination of randomly occurring repeating units of -methyl-1-(pendant group)ethylene with 1-methyl-1-(alternate pendant group)ethylene

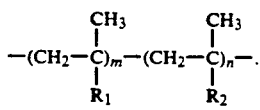

In these formulas, m and n are integers varying from 1 to 300,000. $R_1$ and $R_2$ are organic functional groups which do not interfere with free radical polymerization, and the structures presented represent typical polymer or random-sequence, copolymer sidechains attached to lignin by the process of this invention.

The Process Using Extracted Lignins

An extracted lignin is a naturally-produced, phenoxypropyl-based polymer which has been extracted from in or around the plant cell where it was produced. When using extracted lignins in accordance with the present invention, a lignin graft copolymer of the following formula is produced:

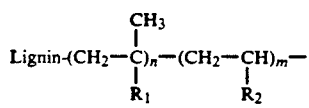

The preparation of this copolymer is accomplished, in general, under oxygen-free conditions by adding a redox initiator, a halide salt, and two monomers,

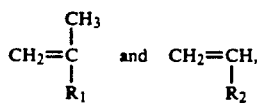

to a lignin dispersion in a suitable solvent and allowing time for graft polymerization to occur.

Alternatively, the reaction can be run with the above monomers and some amount of a diethenyl compound to produce a polymer segment of the structure,

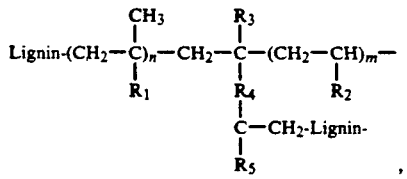

where $R_3$, $R_4$ and $R_5$ are organic or inorganic functional groups which do not interfer with free radical polymerization. The diethenyl compound will cause crosslinking of grafted molecules during the polymerization and, at low concentrations, will produce a higher molecular weight copolymer. At higher concentrations, it can produce a crosslinked solid.

Alternatively, the process of this invention may be applied to a wood pulp or wood fiber used in place of lignin. Wood is defined as the hard fibrous substance, basically xylem, that makes up the greater part of the stems and branches of trees or shrubs. It is found beneath the bark and is also found to a limited extent in herbaceous plants. The Technical Association of the Pulp and Paper Industry recognizes several forms of wood pulp. Early production of groundwood pulp involved pressing wet wood against a wetted rotating grindstone, with the axis of the wood parallel to the axis of the wheel. Ground wood pulp in current use is made by mechanically stronger, synthetic composite stones produced from fine grits of silicon carbide or alumina embedded in a softer ceramic matrix. Groundwood pulp contains a considerable proportion (70–80 weight percent) of fiber bundles, broken fibers, and fines in addition to the individual fibers. The fibers are essentially wood with the original cell-wall lignin intact. They are, therefore, very strong and bulky and do not collapse like the chemicalpulp fibers.

Another type of pulp is refiner mechanical pulp (RMP). The refiners are rotating-disk attrition mills. The disk plates have a number of radical ever-diminishing channels leading from center to edge. The plates are pared face-to-face with a small interval between them. One disk rotates against a stationary disk or they both move in a counterrotating manner. The chips are fed into the channels near the shaft in one of the disks and they move toward the periphery while undergoing attrition. The chips are first broken down into matchstick-like fragments by the action of the breaker bars, then into progressively smaller bundles as they move through the intermediate and finebar sections. They emerge from the periphery as single fibers or fiber fragments, including ribbons and fibrils that were formed by the unraveling of the spiral fiber walls of individual fibers. This process is termed fibrillation. These thin, flexible materials considerably improve the bonding properties of the mechanical pulps. Although it is possible to make refiner mechanical pulp in a single stage, normally two or three refining units are used in a series.

A further form of wood useful in this invention is thermomechanical pulp. If chips are presteamed to 110°–150° C., they become malleable and do not fracture readily under the impact of the refiner bars. This modification is called thermomechanical pulping (TMP). A thermoplasticization of of the wood occurs when it is heated above the glass transition point of wet lignin. Then these chips are fiberized in a refiner at high consistency, whole individual fibers are released; separation occurs at the middle lamella, and the same ribbonlike material described for RMP is produced from the Sl layer of the cell wall. The amount of fibrillization depends on the refining conditions and is critical to the properties of the pulp. There is much less fiber fragmentation than in groundwood pulps or in those produced by RMP.

It is also possible to use chemithermomechanical pulp. The strength properties of thermomechanical pulps can be increased further by mild pre-treatment with sodium sulfite at pH 9–10. The chips are impregnated with chemicals, steamed to 120°–170° C., then refined. The yield is 90–92 percent, which is 2–3 percent lower than in TMP. A range of properties can be obtained by adjusting processing variables but, in general, chemithermomechanical pulping (CTMP) pulps have a greater long-fiber fraction and lower-fines fraction than a comparable thermomechanical pulp. The intact fibers are more flexible than TMP fibers. Chemithermomechanical pulping is particularly suitable for pulping high density hardwoods.

A different approach to wood rendering produces chemical pulps. In chemical pulps, sufficient lignin is dissolved from the middle lamella to allow the fibers to separate with little, if any, mechanical action. However, a portion of the cell-wall lignin is retained in the fiber, and an attempt to remove this during digestion would result in excessive degration of the pulp. For this reason, approximately 3-4 weight percent lignin is normally left in hardwood chemical pulps and 4-10 weight percent lignin is left in softwood chemical pulps. The lignin is subsequently removed by bleaching in separate processing if completely delignified pulps are to be produced. For further information on pulps, see the Kirk-Othmer Encyclopedia of Chemical Technology, Volume 19, pp 392 to 396, Wiley Interscience, (1982), ISBN 0-471-02072-9.

In general, the lower the lignin content of the material to be grafted or treated with this chemistry, the less effective the process for adding sidechains or surface coats is. In this variation of the process, the "lignin" referred to in a discussion of the process is the lignin on the surface of the fiber or pulp. Pulps such as thermomechanical pulp or mechanical pulp have surfaces with a high lignin content and are readily altered by this chemistry. Use of pulp in place of extracted lignin allows easier recovery of the reaction product since the treated pulp can be recovered from the reaction mixture by filtration and all by-products of the reaction, such as dissolved graft copolymer, can be recovered by the separations described under treatments of lignin reaction products The product of this reaction on pulp is a surface-modified pulp which has a polymeric sidechain grown off of the surface of the pulp fiber or particle.

The process gives a product with the structure:

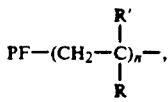

where "PF" designates Pulp Fiber or Particle where R' is an H or $CH_3$ unit and R is any group which does not interfere with free radical polymerization. Any of the sidechains described above for grafting to lignin can be attached to pulp, wood or wood fiber by the process herein described.

Process Using 0.02 to 40 Weight Percent Lignin or Wood

The process for preparation of lignin graft copolymer in solvent will now be illustrated for a sample composed of between 0.02 and 40.0 weight percent lignin, wood, or wood pulp; 0.1 and 40 weight percent monomer; 0.2 and 15.3 weight percent halide salt; and 10 to 98 weight percent solvent. Significant variation in reaction mixture composition is possible as will be illustrated in the examples to follow. This method will now be described, generally.

As a suitable solvent for the graft copolymerization of the present invention, it should be noted that often, organic solvents are used and, of these, solvents which dissolve both the monomer and the product copolymer are preferred to make graft copolymers of lignin. Solvents which dissolve the monomer are preferred for grafting wood or wood pulp. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane. However, it is also possible to use inorganic solvents such as water for the reaction.

An aliquot of about 20 mL of purified solvent is placed in a 125 mL conical flask or stopperable test tube. Lignin, wood, or wood pulp and a finely ground, anhydrous, halide-containing salt are added to the purified solvent and the mixture is stirred for about 20 minutes while being bubbled with nitrogen. After 10 minutes of nitrogen saturation, a hydroperoxide such as hydrogen peroxide, sodium peroxyborate, magnesium peroxyphthalate, sodium percarbonate, or 2-hydroperoxy-1,4-dioxycyclohexane is added to the reaction mixture. This addition can be made by adding an aqueous solution of the peroxide for safe handling or the peroxide can be added directly. In certain polymerizations containing water sensitive monomers or reagents, the use of the anhydrous solid peroxides, sodium peroxyborate, magnesium peroxyphthalate, or sodium percarbonate, is preferred. Solid ethene monomer, a nitrogen-saturated solution of monomer, liquid monomer or liquid monomer in solvent are added while nitrogen gas is bubbled into the mixture. The graft copolymer can also be produced by adding nitrogen-saturated monomer to the reaction mixture in another solvent. The reaction starts immediately. The flask contents will often thicken slowly but may even solidify into a precipitate-laden, viscous slurry.

The reaction may be run at any temperature between 0° C. and 40° C. but a controlled temperature of 30° C. has been used for most reactions used as examples herein. Although the reaction is rapid, it is allowed to sit for two days in the examples shown here. Typical process reaction times for industrial synthesis of these graft copolymers would be 1 to 2 hours with a one hour total synthesis time preferred. The reaction is then terminated with 0.5 mL of 1 weight percent of hydroquinone in water or any other radical scavenger. The reaction mixture is diluted with 100 mL of water and, if the sidechain attached to the lignin is hydrophobic, the reaction mixture is stirred until a uniform reaction product is precipitated. The solid is washed with water or suitable nonsolvent and dried. To obtain product from a reaction which has placed one or more hydrophilic sidechains on lignin, the reaction mixture is first diluted with 100 mL of water. The aqueous solution can then be dialyzed against pure water using a 3,500-upper-molecular-weight-permeable, dialysis membrane for several days to obtain highest purity copolymer. The aqueous solution containing the solid is freeze-dried after dialysis or, alternatively for less pure copolymer, is freeze dried immediately after dilution with water. Product can also be recovered by spray drying. Yield is calculated from the formula: (g=grams)

$$\text{weight percent yield} = \frac{(\text{g polymer recovered})}{\text{g lignin added} + \text{g monomer added}}$$

It is preferred that all reagents used be of reagent grade purity but less pure materials may be used if they do not contain inhibitors for the reaction. Other changes in this procedure, evident to those skilled in synthesis or chemical manufacture can be made. Other hydroperoxides may be used in place of the hydrogen peroxide listed above. The graft copolymerization reaction can be conducted with or without stirring once the monomer and metal salt have been dispersed in the reaction mixture. The reaction is allowed to proceed for 1 to 200 hours, with 48 hours being a typical, lab-scale reaction time and 1 hour being a preferred industrial synthesis time. It is preferred to terminate a lab-scale copolymerization by addition of a free radical scavenger such as hydroquinone or exposure of the reaction mixture to oxygen on an industrial scale reaction.

The graft terpolymer is easily recovered from a liquid reaction mixture. If the reaction mixture is a gel or thick slurry, it can be made pourable by mixing therewith 1 to 3 times its volume of distilled or deionized water under low shear conditions until a homogeneous, pourable system is formed from reactions which have attached a hydrophilic sidechain to lignin. The solution or slurry is precipitated in a non-solvent. The precipitated graft copolymer is removed from the non-solvent solution by filtration, washed with non-solvent, filtered, and vacuum-dried to a constant weight. A purer product can be obtained by the dialysis-freeze drying process described above. For hydrophobic graft copolymers of lignin, the addition of the 1 to 3 times reaction-mixture-volume of distilled or deionized water to the reaction mixture will precipitate the product and allow recovery of graft copolymer by filtration. Grafted wood or wood pulp can be recovered directly from the reaction mixture by filteration or centrifugation.

The following examples illustrate certain embodiments of this invention wherein parts and percentages are by weight, and temperatures are in centigrade unless otherwise indicated. Indulin AT, a commercial lignin product of the Westvaco Corporation, and Eastman reagent-grade 2-propenamide were used in these synthesis. Dimethyl sulfoxide, of reagent grade, from Fisher Chemical Company and anhydrous calcium chloride from Mallinckrodt Chemical Company were used in these experiments. All halide salts were reagent grade. The potassium fluoride was Baker Reagent Grade, anhydrous material number 1-3124, the sodium fluoride was Baker Reagent Grade material number 3688, while the sodium bromide was from Fisher Scientific, material number S-254. The hydrogen peroxide used was a 30 percent, aqueous solution from lot B17A, produced by Eastman Kodak, Rochester, N.Y. 14650. The hydroquinone solution was 1 weight percent hydroquinone in distilled water. To calculate certain concentrations, a density of 1.1174 g/mL has been used for 30 percent hydrogen peroxide and a density of 1.1014 g/mL has been used for dimethylsulfoxide.

The present invention will now be further illustrated by certain examples and references which are provided for purposes of illustration only and are not intended to limit the present invention.

EXAMPLES

The material of Examples 1 to 19 is poly(lignin-g-(1-amidoethylene)) and will be referred to as a copolymer 1.

Example 1

A total of 0.50 g of aspen lignin and 0.62 g of calcium chloride were placed in a 150 mL beaker containing 11.28 g of dimethylsulfoxide. The mixture was stirred and bubbled with nitrogen ($N_2$) for about 22 minutes before 0.482 mL of 30 percent, aqueous hydrogen peroxide from Fisher Chemical Company were added to the reaction mixture. $N_2$ was bubbled through the reaction mixture for about 4 more minutes and 3.20 g of 2-propenamide in 10.0 g of dimethylsulfoxide, which had been stirred together and nitrogen-saturated for about 20 minutes, were then added. After about 2 minutes of stirring and $N_2$ bubbling, the flask was stoppered and placed in a 30° C. bath for 2 days. The chloride content of the reaction mixture was 1.519 weight percent. The solids content of the reaction mixture was 16.51 weight percent. The reaction was then terminated by adding 0.5 mL of 1% hydroquinone and 100 mL of water thereto. The aqueous solution is dialyzed against pure water using a 3,500-upper-molecular-weight-permeable, dialysis membrane for 3 days. The dilute reaction product from the dialysis tube was recovered by freeze drying and found to weigh 3.48 g. The product was labeled 26-14-1. Yield=94.05 weight percent.

The lignin used in Example 1 is a steam-exploded, I-O-TECH process, wood extract. The wood was first exploded and then extracted with $CCl_4$ at approximately room temperature (24° C.) and reduced pressure. After extraction of the tetrachloromethane solubles, the wood pulp was extracted with methanol at approximately 60° C. and reduced pressure. The lignin, 26-14-10, was recovered from methanol used in this second extraction. The sample was provided by Dave Johnson of the Solar Energy Research Institute of Golden, Colo. It was labeled 26-14-10 and was used as received. This example shows that different lignins recovered by different methods can be grafted by this process to produce graft copolymer.

Example 2

A total of 0.50 g of kraft pine lignin and 0.68 g of sodium chloride (lot KMKB, Sargent-Welch Scientific Supply Company.) were placed in a 150 mL beaker containing 11.28 g of dimethylsulfoxide. The mixture was stirred and bubbled with nitrogen ($N_2$) for about 10 minutes before 0.482 mL of 30 percent, aqueous hydrogen peroxide from Fisher Chemical Company were added to the reaction mixture. $N_2$ was bubbled through the reaction mixture for about 4 more minutes and 3.21 g of 2propenamide in 10.0 g of dimethylsulfoxide, which had been stirred together and nitrogen-saturated for about 14 minutes, were then added. The flask was stoppered and placed in a 28° C. bath for 2 days. The chloride content of the reaction mixture was 1.58 weight percent. The solids content of the reaction mixture was 16.74 weight percent. The reaction mixture was then terminated by adding 1.0 mL of 1% hydroquinone and 100 mL of water thereto. The aqueous solution is dialyzed against pure water using a 3,500-upper-molecular-weight-permeable, dialysis membrane for 3 days. The dilute reaction product from the dialysis tube was recovered by freeze drying and found to weigh 3.56 g. The product was labeled 26-18-1. Yield=95.96 weight percent.

Example 2 shows that various chloride salts can be used to make the graft copolymer since sodium chloride is used in this example instead of the calcium chloride used in Example 1.

Example 3

A total of 0.50 g of kraft pine lignin and 0.63 g of calcium chloride were placed in a 150 mL beaker containing 11.29 g of dimethylsulfoxide. The mixture was stirred and bubbled with nitrogen ($N_2$) for about 12 minutes before 0.2334 g of sodium peroxyborate from Interox Chemical Company were added to the reaction mixture. $N_2$ was bubbled through the reaction mixture for about 2 minutes and 3.20 g of 2-propenamide in 10.0 g of dimethylsulfoxide, which had been stirred together and nitrogen-saturated for about 17 minutes, were then added. After about 5 minutes of stirring and $N_2$ bubbling, the flask was stoppered and placed in a 30° C. bath for 2 days. The chloride content of the reaction mixture was 1.56 weight percent. The solids content of the reaction mixture was 16.75 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The dilute reaction product from the dialysis tube was recovered by freeze drying and found to weigh 1.46 g. The product was labeled 26-20-1. Yield=38.62 weight percent.

Example 3 shows that various peroxide salts can be used to make the graft copolymer since sodium peroxyborate is used in this example instead of the hydrogen peroxide used in Examples 1 and 2.

Example 4

A total of 0.50 g of kraft pine lignin and 0.63 g of calcium chloride were placed in a 150 mL beaker containing 11.29 g of dimethylsulfoxide. The mixture was stirred and bubbled with nitrogen ($N_2$) for about 14 minutes before 0.7532 g of magnesium peroxyphthalte from Interox Chemical Company were added to the reaction mixture. The reaction mixture smoked and apparently underwent rapid heating. $N_2$ was bubbled through the reaction mixture as 3.20 g of 2-propenamide in 10.0 g of dimethylsulfoxide, which had been stirred together and nitrogensaturated for about 15 minutes, were immediately added. After about 5 minutes of stirring and $N_2$ bubbling, the flask was stoppered and placed in a 30° C. bath for 2 days. The chloride content of the reaction mixture was 1.53 weight percent. The solids content of the reaction mixture was 19.28 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product was a turbid suspension which was centrifuged in 3 batches with 1 equipment rinse at 6200 rpm for 25 minutes at a temperature of 25° to 40° C. Weight of centrifuge bottle after spinning and drying minus weight of dry bottle before spinning is 53.79115 g−53.6920 g=0.09915 g. The dilute reaction product from the dialysis tube was recovered by freeze drying and found to weigh 0.62 g. The product was labeled 26-22-1. Yield=16.66 weight percent.

Example 4 shows that various peroxide salts can be used to make the graft copolymer since magnesium peroxyphthalte is used in this example instead of the hydrogen peroxide used in Examples 1 and 2. Further, the example shows that some peroxides are more reactive than others and produce larger yields of copolymer. The peroxide chosen to initiate a polymerization must be of an experimentally-determined, optimum reactivity to produce high yield of a given copolymer. The choice of peroxide will also alter the physical properties of the copolymer since Example 4 shows that 26-22-1 had, before centrifugation, an insoluble fraction amounting to 19.8 weight percent of the original lignin put into the reaction mixture.

Example 5

A total of 0.50 g of kraft pine lignin and 0.63 g of calcium chloride were placed in a 150 mL beaker containing 11.28 g of dimethylsulfoxide. The mixture was stirred and bubbled with nitrogen ($N_2$) for about 13 minutes before 0.2660 g of sodium percarbonate from Interox Chemical Company were added to the reaction mixture. The percarbonate granules did not dissolve and could be seen on the bottom of the reaction vessel for the duration of the reaction. $N_2$ was bubbled through the reaction mixture as 3.20 g of 2-propenamide in 10.0 g of dimethylsulfoxide, which had been stirred together and nitrogen saturated for about 17 minutes, were then added. After about 10 minutes of stirring and $N_2$ bubbling, the flask was stoppered and placed in a 30° C. bath for 2 days. The chloride content of the reaction mixture was 1.55 weight percent. The solids content of the reaction mixture was 17.76 weight percent. The reaction was then terminated by adding 1.0 mL of 1% hydroquinone and 100 mL of water thereto. Upon the addition of the water, a precipitate formed. The aqueous solution is dialyzed against pure water using a 3,500-upper-molecular-weight-permeable, dialysis membrane for 3 days. The product was a turbid suspension which was centrifuged in 3 batches with 1 equipment rinse at 6200 rpm for 25 minutes at a temperature of 25° to 40° C. Weight of centrifuge bottle after spinning and drying minus weight of dry bottle before spinning is 44.1826 g−44.0380 g=0.1446 g. The dilute reaction product from the dialysis tube was recovered by freeze drying and found to weight 0.86 g. The product was labeled 26-24-1. Yield=26.88 weight percent.

Example 5 shows that various peroxide salts can be used to make the graft copolymer since sodium percarbonate is used in this example instead of the hydrogen peroxide used in Examples 1 and 2. Further, the example shows that some peroxides are more reactive than others and produce larger yields of copolymer. The peroxide chosen to initiate a polymerization must be of an experimentally-determined, optimum reactivity to produce high yield of a given copolymer. The choice of peroxide will also alter the physical properties of the copolymer since Example 5 shows that 26-24-1 had, before centrifugation, an insoluble fraction amounting to 28.9 weight percent of the original lignin put into the reaction mixture. The example also shows that greater yield of copolymer coupled with production of more insolubles and grafting of less lignin can be produced by choice of peroxide and reaction conditions.

Example 6

A total of 0.5030 g of kraft pine lignin and 1.626 g of potassium bromide were placed in a 150 mL beaker containing 16.0 mL of dimethylsulfoxide. The potassium bromide was ground into a powder before use. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 4.312 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The bromide content of the reaction mixture was 2.90 weight percent. The solids content of the reaction mixture was 17.12 weight percent. The reaction was then terminated by adding 1.0 mL of 1% hydroquinone and 100 mL of water thereto. The aqueous solution was added dropwise to 800 mL of stirred 2-propanone and the precipitated product recovered by filtration. The filtrate was dissolved in 100 mL of water. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.04 g. The product was labeled 27-12-a. Yield=0.83 weight percent.

Example 7

A total of 0.5040 g of kraft pine lignin and 1.5628 g of potassium bromide were placed in a 150 mL beaker containing 16.0 mL of dimethylsulfoxide. The potassium bromide was ground into a powder before use. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 2.884 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The bromide content of the reaction mixture was 2.90 weight percent. The solids content of the reaction mixture was 13.70 weight percent. The reaction was then terminated by adding 1.0 mL of 1% hydroquinone and 100 mL of water thereto. The aqueous solution was added dropwise to 800 mL of stirred 2-propanone and the precipitated product recovered by filtration. The filtrate was dissolved in 100 mL of water. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.053 g. The product was labeled 27-12-b. Yield=1.56 weight percent.

Example 8

A total of 0.4980 g of kraft pine lignin and 1.577 g of potassium bromide were placed in a 150 mL beaker containing 16.0 mL of dimethylsulfoxide. The potassium bromide was ground into a powder before use. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 1.4375 g of 2-propenamide in 11.5 mL of dimethylsulfoxide, which had been stirred together and nitrogen-saturated for about 17 minutes, were then added. After about 10 minutes of stirring and $N_2$ bubbling, the flask was stoppered and placed in a 30° C. bath for 2 days. The bromide content of the reaction mixture was 3.05 weight percent. The solids content of the reaction mixture was 10.12 weight percent. The reaction was then terminated by adding 1.0 mL of 1% hydroquinone and 100 mL of water thereto. The aqueous solution was added dropwise to 800 mL of stirred 2-propanone and the precipitated product recovered by filtration. The filtrate was dissolved in 100 mL of water. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.22 g. The product was labeled 27-12-c. Yield=11.37 weight percent.

Examples 6, 7 and 8 show that various bromide salts can be used to make the graft copolymer since potassium bromide is used in these examples instead of the calcium chloride used in Example 1 or the sodium chloride used in Example 2.

Example 9

A total of 0.4990 g of kraft pine lignin and 0.3560 g of lithium fluoride were placed in a 150 mL beaker containing 16.0 g of dimethylsulfoxide. The lithium fluoride was a powder and was used as received. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 4.3200 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The fluoride content of the reaction mixture was 0.718 weight percent. The solids content of the reaction mixture was 9.74 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.64 g. The product was labeled 27-16-a. Yield=13.28 weight percent.

Example 10

A total of 0.5025 g of kraft pine lignin and 0.3540 g of lithium fluoride were placed in a 150 mL beaker containing 16.0 mL of dimethylsulfoxide. The lithium fluoride was a powder and was used as received. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 2.9475 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The fluoride content of the reaction mixture was 0.740 weight percent. The solids content of the reaction mixture was 10.87 weight percent. The reaction was then terminated by adding 1.0 mL of 1% hydroquinone and 100 mL of water thereto. The aqueous solution was added dropwise to 800 mL of stirred 2-propanone and the precipitated product recovered by filtration. The filtrate was dissolved in 100 mL of water. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.55 g. The product was labeled 27-16-b. Yield=15.94 weight percent.

Example 11

A total of 0.5000 g of kraft pine lignin and 0.3555 g of lithium fluoride were placed in a 150 mL beaker containing 16.0 mL of dimethylsulfoxide. The lithium fluoride was a powder and was used as received. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 1.4365 g of 2-propenamide in 11.5 mL of dimethylsulfoxide, which had been stirred and nitrogen-saturated for about 10 minutes, were then added. After about 10 minutes of stirring and $N_2$ bubbling, the flask was stoppered and placed in a 30° C. bath for 2 days. The fluoride content of the reaction mixture was 0.777 weight percent. The solids content of the reaction mixture was 6.85 weight percent. The reaction was then terminated by adding 1.0 mL of 1% hydroquinone and 100 mL of water thereto. The aqueous solution was added dropwise to 800 mL of stirred 2-propanone and the precipitated product recovered by filtration. The filtrate was dissolved in 100 mL of water. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.55 g. The product was labeled 27-16-c. Yield = 14.46 weight percent.

Examples 9, 10 and 11 show that various fluoride salts can be used to make the graft copolymer since lithium fluoride is used in these examples instead of the calcium chloride used in Example 1 or the sodium chloride used in Example 2.

Example 12

A total of 0.5005 g of kraft pine lignin and 1.4100 g of sodium bromide were placed in a 150 mL beaker containing 16.0 mL of dimethylsulfoxide. The sodium bromide was a powder and was used as received. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 4.3115 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The bromide content of the reaction mixture was 2.927 weight percent. The solids content of the reaction mixture was 16.63 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.203 g. The product was labeled 27-17-a. Yield = 4.22 weight percent.

Example 13

A total of 0.4995 g of kraft pine lignin and 1.4110 g of sodium bromide were placed in a 150 mL beaker containing 16.0 mL of dimethylsulfoxide. The sodium bromide was a powder and was used as received. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 2.8785 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The bromide content of the reaction mixture was 3.046 weight percent. The solids content of the reaction mixture was 13.31 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown substance. The dilute reaction product from the dialysis tube was recovered by freeze drying and found to weigh 0.40 g. The product was labeled 27-17-b. Yield = 11.84 weight percent.

Example 14

A total of 0.5015 g of kraft pine lignin and 1.4065 g of sodium bromide were placed in a 150 mL beaker containing 16.0 mL of dimethylsulfoxide. The sodium bromide was a powder and was used as received. The mixture was stirred and bubbled with nitrogen ($N_2$) for about 10 minutes before 0.80 mL of hydrogen peroxide were added to the reaction mixture. $N_2$ was bubbled through the reaction mixture for 8 minutes before 1.4380 g of 2-propenamide in 11.5 mL of dimethylsulfoxide, which had been stirred together and nitrogen-saturated for about 10 minutes, were then added. After about 10 minutes of stirring and $N_2$ bubbling, the flask was stoppered and placed in a 30° C. bath for 2 days. The bromide content of the reaction mixture was 3.163 weight percent. The solids content of the reaction mixture was 9.691 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.210 g. The product was labeled 27-17-c. Yield = 10.82 weight percent.

Examples 12, 13 and 14 show that various bromide salts can be used to make the graft copolymer since sodium bromide is used in these examples instead of the calcium chloride used in Example 1 or the sodium chloride used in Example 2.

Examples 15, 16, 17, 18 and 19 are results on a yellow poplar lignin. The material was produced by BioRegional Energy Associates of Floyd, Va. It is produced by steam exploding the wood, washing with water, extracting with alkali, and precipitating with mineral acid. The lignin has a high carboxylic acid content and a high level of phenolic hydroxyl groups. Molecular weight of the product is 1,000 to 1,200. The material is labeled 25-116-A.

Example 15

A total of 0.4918 g of steam explosion lignin and 1.5529 g of potassium bromide were placed in a 150 mL beaker containing 16.0 mL of dimethylsulfoxide. The potassium bromide was a powder and was used as received. The mixture was stirred and bubbled with nitrogen ($N_2$) for about 10 minutes before 0.80 mL of hydrogen peroxide were added to the reaction mixture. The reaction mixture sat for 5 minutes before 2.8541 g of 2propenamide in 11.5 mL of dimethylsulfoxide, which had been stirred together and nitrogen-saturated for about 10 minutes were added. After about 10 minutes of stirring and $N_2$ bubbling, the flask was stoppered and placed in a 30° C. bath for 2 days. The bromide content of the reaction mixture was 2.890 weight percent. The solids content of the reaction mixture was 13.58 weight percent. The reaction was then terminated by adding 1.0 mL of 1% hydroquinone and 100 mL of water thereto. The aqueous solution was added dropwise to 800 mL of stirred 2-propanone and some precipitated product was seen. The 2-propanone was evaporated on a rotary evaporator and the thick, bottom phase of the residue was added to 100 mL of water. Some product may have been lost in the upper phase of the evaporated sample. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 0.98 g. The product was labeled 28-15-2. The lignin content of the product was 19.99 weight percent. Yield=29.28 weight percent.

Example 16

A total of 0.5051 g of steam explosion lignin and 1.3549 g of potassium bromide were placed in a 150 mL beaker containing 16.0 mL of dimethylsulfoxide. The potassium bromide was a powder and was used as received. The mixture was stirred and bubbled with nitrogen ($N_2$) for about 10 minutes before 0.80 mL of hydrogen peroxide were added to the reaction mixture. The reaction mixture sat for 5 minutes before 1.4581 g of 2-propenamide in 11.5 mL of dimethylsulfoxide, which had been stirred together and nitrogen-saturated for about 10 minutes, were added. After about 10 minutes of stirring and $N_2$ bubbling, the flask was stoppered and placed in a 30° C. bath for 2 days. The bromide content of the reaction mixture was 2.637 weight percent. The solids content of the reaction mixture was 9.62 weight percent. The reaction was then terminated by adding 1.0 mL of 1% hydroquinone and 100 mL of water thereto. The aqueous solution was added dropwise to 800 mL of stirred 2-propanone and some precipitated product was seen. The 2-propanone was evaporated on a rotary evaporator and the thick, bottom phase of the residue was added to 100 mL of water. Some product may have been lost in the upper phase of the evaporated sample. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying but was not quantified. The product was labeled 28-15-3. The lignin content of the product was 46.62 weight percent. Yield was not calculated.

Example 17

A total of 0.51 g of steam explosion lignin and 0.34 g of lithium fluoride were placed in a 150 mL beaker containing 16.0 mL of dimethylsulfoxide. The lithium fluoride was a powder and was used as received. The mixture was stirred and bubbled with nitrogen ($N_2$) for about 10 minutes before 0.80 mL of hydrogen peroxide were added to the reaction mixture. The reaction mixture sat for 5 minutes before 4.35 g of 2-propenamide in 11.5 mL of dimethylsulfoxide, which had been stirred together and nitrogen-saturated for about 10 minutes, were added. After about 10 minutes of stirring and $N_2$ bubbling, the flask was stoppered and placed in a 30° C. bath for 2 days. The fluoride content of the reaction mixture was 0.684 weight percent. The solids content of the reaction mixture was 5.19 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 2.11 g. The product was labeled 28-16-4. The lignin content of the product was 21.88 weight percent. Yield=43.41 weight percent.

Example 18

A total of 0.50 g of steam explosion lignin and 0.30 g of lithium fluoride were placed in a 150 mL beaker containing 16.0 mL of dimethylsulfoxide. The lithium fluoride was a powder and was used as received. The mixture was stirred and bubbled with nitrogen ($N_2$) for about 10 minutes before 0.80 mL of hydrogen peroxide were added to the reaction mixture. The reaction mixture sat for 5 minutes before 2.82 g of 2-propenamide in 11.5 mL of dimethylsulfoxide, which had been stirred together and nitrogen-saturated for about 10 minutes, were added. After about 10 minutes of stirring and $N_2$ bubbling, the flask was stoppered and placed in a 30° C. bath for 2 days. The fluoride content of the reaction mixture was 0.632 weight percent. The solids content of the reaction mixture was 10.40 weight percent. The reaction was terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 2.96 g. The product was labeled 28-16-5. The lignin content of the product was 15.71 weight percent. Yield=89.15 weight percent.

Example 19

A total of 0.49 g of steam explosion lignin, 25-116-A, and 0.28 g of lithium fluoride were placed in a 150 mL beaker containing 16.0 mL of dimethylsulfoxide. The lithium fluoride was a powder and was used as received. The mixture was stirred and bubbled with nitrogen ($N_2$) for about 10 minutes before 0.80 mL of hydrogen peroxide were added to the reaction mixture. The reaction mixture sat for 5 minutes before 1.45 g of 2-propenamide in 11.5 mL of dimethylsulfoxide, which had been stirred together and nitrogen-saturated for about 10 minutes, were added. After about 10 minutes of stirring and $N_2$ bubbling, the flask was stoppered and placed in a 30° C. bath for 2 days. The fluoride content of the reaction mixture was 0.614 weight percent. The solids content of the reaction mixture was 6.65 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weigh 1.75 g. The product was labeled 28-16-7. The lignin content of the product was 29.62 weight percent. Yield=90.20 weight percent.

Examples 15, 16, 17, 18 and 19 show that various bromide salts can be used to make the graft copolymer since potassium bromide is used in some of these examples. These examples also show that various fluoride salts can be used to make the graft copolymer since lithium fluoride is used in some syntheses. Further, calcium chloride is used in Example 1 and sodium chloride is used in Example 2. In totum, these examples show that halide salts can be used as co-initiators in the synthesis of graft copolymers of lignin when coupled with a peroxide. The examples also show that various lignins can be used in the synthesis of the complex polymer.

Example 20

A total of 0.678 g of lignin and 0.338 g of calcium chloride were placed in a 125 mL test tube containing 10.0 g of dimethylsulfoxide. The mixture was stir-bubbled with nitrogen ($N_2$) for about 2 minutes before 0.65 mL of 30 percent, aqueous hydrogen peroxide were added to the reaction mixture. $N_2$ was bubbled through the reaction mixture for about 2 more minutes and 1.41 g of 2-propenamide (I) in 10 g of dimethylsulfoxide was then added. After about 2 minutes of stirring and $N_2$ bubbling, 0.29 g of 2-propenamide (I) and 3.33 g of 2-methyl-N7,N7-dimethyl-7-ammonium-3-oxo-4-oxyoct-1-ene chloride (II) in 27.85 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction solution was 3 to 2. The chloride content of the reaction mixture was 1.44 weight percent. The calcium chloride content was 0.62 weight percent. The solids content of the reaction mixture was 10.66 weight percent. The reaction was then terminated by adding 0.5 mL of 1% hydroquinone and 100 mL of water thereto. The stirred reaction mixture was precipitated in ¼ L of 2-propanone and recovered by filtration. The recovered solid was dissolved in 100 mL of water and 0.41 g of disodium oxalate were added to the product to precipitate the calcium ion in the product. The aqueous solution with precipitate is dialyzed against pure water for 3 days. The polymer solution is centrifuged and the supernate, pure polymer solution is poured off. The dilute reaction product from the dialysis tube was recovered by freeze drying and found to weigh 4.122 g. The product was labeled 24-117-4. Yield=72.22 weight percent. The nitrogen content of the product was 1.23 weight percent. The chloride content of the product was 5.97 weight percent. Limiting viscosity number, [N] which is eta, of the product was 12.99 dL/g.

Example 21

A total of 0.672 g of lignin and 0.335 g of calcium chloride were placed in a 125 mL test tube containing 15.0 g of dimethylsulfoxide. The mixture was stir-bubbled with nitrogen ($N_2$) for about 3 minutes before 0.65 mL of 30 percent, aqueous hydrogen peroxide were added to the reaction mixture. $N_2$ was bubbled through the reaction mixture for about 3 more minutes and 1.12 g of 2-propenamide (I) in 15 g of dimethylsulfoxide was then added. After about 2 minutes of stirring and $N_2$ bubbling, 4.93 g of 2-methyl-N7,N7-dimethyl-7-ammonium-3-oxo-4-oxyoct-1-ene chloride (II) in 32.89 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction solution was 2 to 3. The chloride content of the reaction mixture was 1.50 weight percent. The calcium chloride content was 0.47 weight percent. The solids content of the reaction mixture was 9.65 weight percent. The reaction was then terminated by adding 0.5 mL of 1% hydroquinone and 100 mL of water thereto. The stirred reaction mixture was precipitated in ¼ L of 2-propanone and recovered by filtration. The recovered solid was dissolved in 100 mL of water and 0.41 g of disodium oxalate were added to the product to precipitate the calcium ion in the product. The aqueous solution with precipitate is dialyzed against pure water for 3 days. The polymer solution is centrifuged and the supernate, pure polymer solution is poured off. The dilute reaction product from the dialysis tube was recovered by freeze drying and found to weigh 2.71 g. The product was labeled 24-117-5. Yield=40.31 weight percent. The nitrogen content of the product was 6.19 weight percent. Limiting viscosity number, [N], of the product was 7.3 dL/g.

Examples 20 and 21 show that very different ratios of monomers can be used to produce high yields of copolymer. Examples 20 and 21 show that chloride ion concentration can vary from below 1.37 weight percent of the reaction mixture to over 1.50 weight percent (Example 21) with copolymer still produced from the reaction. The calcium chloride content of these reactions also varies from 0.92 weight percent to 0.47 weight percent (Example 21) with product still produced in the reaction. The process for making these materials is thus flexible and versatile.

Example 22

A total of 0.672 g of lignin and 0.335 g of calcium chloride were placed in a 125 mL test tube containing 8.0 g of dimethylsulfoxide. The mixture was stir-bubbled with nitrogen ($N_2$) for about 2 minutes before 0.65 mL of 30 percent, aqueous hydrogen peroxide were added to the reaction mixture. $N_2$ was bubbled through the reaction mixture for about 2 more minutes and 0.29 g of 2-propenamide (I) in 8 g of dimethylsulfoxide was then added. After about 2 minutes of stirring and $N_2$ bubbling, 7.40 g of 2-methyl-N7,N7-dimethyl-7-ammonium-3-oxo-4-oxyoct-1-ene chloride (II) in 12.02 g of dimethylsulfoxide and 3.18 g of water were added. After about 10 minutes of stirring and bubbling $N_2$ through the reaction mixture, the flask was stoppered was placed in a 30° C. bath for 2 days. The mole ratio of monomer I to II in the reaction solution was 1 to 9. The chloride content of the reaction mixture was 3.65 weight percent. The calcium chloride content was 0.83 weight percent. The solids content of the reaction mixture was 23.05 weight percent. The reaction was then terminated by adding 0.5 mL of 1% hydroquinone and 100 mL of water thereto. The stirred reaction mixture was precipitated in ¼ L of 2-propanone and recovered by filtration. The recovered solid was dissolved in 100 mL of water and 0.41 g of disodium oxalate were added to the product to precipitate the calcium ion in the product. The aqueous solution with precipitate is dialyzed against pure water for 3 days. The polymer solution is centrifuged and the supernate, pure polymer solution is poured off. The dilute reaction product from the dialysis tube was recovered by freeze drying and found to weigh 7.80 g. The product was labeled 24-117-7 Yield=93.27 weight percent. The nitrogen content of the product was 5.68 weight percent. The chloride content of the product was 10.65 weight percent. Limiting viscosity number, [N], of the product was 4.97 dL/g.

Example 23

A total of 0.678 g of lignin and 0.338 g of calcium chloride were placed in a 125 mL test tube containing 7.0 g of dimethylsulfoxide. The mixture was stir-bubbled with nitrogen ($N_2$) for about 2 minutes before 0.65 mL of 30 percent, aqueous hydrogen peroxide were added to the reaction mixture. $N_2$ was bubbled through the reaction mixture for about 2 more minutes. After about 2 minutes of stirring and $N_2$ bubbling, 8.21 g of -methyl-N7,N7-dimethyl-7-ammonium-3-oxo-4-oxyoct-1-ene chloride (II) in 19.67 g of dimethylsulfoxide and 3.55 g of water were added. After about 10 minutes of stirring and $N_2$ bubbling through the reaction mixture, the flask was stoppered and placed in a 30° C. bath for 2 days. The mole ratio of monomer I to II in the reaction solution was to 100. This sample was pure II monomer and formed poly(lignin-g-(1-methyl-1-(N5,N5-dimethyl-5-ammonium-1-oxo-2-oxyhexyl), ethylene chloride)), a graft copolymer with a one repeat unit sidechain. The chloride content of the reaction mixture was 4.04 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate were added to the product to precipitate the calcium ion in the product. The aqueous solution with precipitate is dialyzed against pure water for 3 days. The polymer solution is centrifuged and the supernate, pure polymer solution is poured off. The dilute reaction product from the dialysis tube was recovered by freeze drying and found to weigh 8.55 g. The product was labeled 24-117-8. Yield =96.2 weight percent. The nitrogen content of the product was 5.49 weight percent. Limiting viscosity number, [N], of the product was 36.63 dL/g.

Examples 22 and 23 illustrate that much higher molecular weight copolymers can be made by these methods by altering the solvent mixture. The addition of water in these reactions causes high monomer II reactions to produce high molecular size, high molecular weight copolymers in high yields. Thus, a solvent mixture can be used to increase yield and increase molecular size by choosing a solvent mixture which is sufficiently polar so as to dissolve completely all of the monomer to be added to the lignin. Alternatively, a single solvent can be used which is highly effective in dissolving both the monomer and polymer. The polymerization does not have to be done in solvent but can also be run within a fluid monomer (neat), in suspension in a non-solvent for lignin or monomer, or in an emulsion. Further, Example 22 shows again that very different ratios of monomers can be used to produce high yields of copolymer with this art. Example 22 has a monomer I to II ratio of 1 to 9, significantly lower than that of all other examples. Examples 20 and 22 thus demonstrate the extreme versatility of this method in producing product from monomer mixtures of extremely different composition. The grafted side chain or chains in Examples 20 to 23 are made of random units of 2-propenamide and 2-methyl-N7,N7-dimethyl-7-ammonium-3-oxo-4-oxyoct-1-ene chloride or methylsulfate. Of course, suitable counter anions other than chloride or methylsulfate, such as bromide, nitrate or bicarbonate, are considered within the scope of monomers useful in the process.

Moreover, the actual content of the grafted side chain or chains depends upon the molar ratio of monomer reactants employed. In the above examples, it is acceptable to use from about 0 molar percent to 99 molar percent of 2-propenamide to about 100 molar percent to 1 molar percent of 2-methyl-N7,N7-dimethyl-7-ammonium-3-oxo-4-oxyoct-1-ene chloride or methylsulfate. However, it is preferable to use a molar percent in the range of 5 to 95 or 95 to 5, respectively. The grafted side chain or chains appear to occur at one or more of the 2-, 5-or 6-aromatic ring positions on the oxyphenylpropene moiety. Of course the precise content of the grafted side chain or chains depends upon the contemplated use. For example, in uses where water solubility is required, more of the cationic monomer should be used. Conversely, where less ionic character is desired, more of the 2-propenamide monomer should be used.

TABLE 1

Results of Other Reactions Using this Technology
Poly(lignin-g-((1-amidoethlene)-co-(1-methyl-1-(N5,N5-dimethyl-5-ammonium-1-oxo-2-oxyhexyl)ethylene chloride))

| Example Number | Sample Number | Weight in Grams | | | | Volume (ML) | | Yield (wt. %) |
|---|---|---|---|---|---|---|---|---|
| | | Lignin | Calcium Chloride | Monomer I | Monomer II | Dimethyl Sulfoxide | Hydrogen Peroxide | |
| 24 | 24-44-1 | .671 | 0.335 | 2.26 | 1.58 | 29.41 | 0.65 | 63.4 |
| 25 | 24-44-2 | .678 | 0.338 | 1.62 | 3.17 | 29.37 | 0.65 | 61.83 |
| 26 | 24-44-3 | .671 | 0.335 | 1.34 | 4.74 | 29.16 | 0.65 | 69.62 |
| 27 | 24-44-4 | .683 | 0.341 | 0.63 | 6.36 | 29.34 | 0.65 | 67.78 |
| 28 | 24-44-5 | .671 | 0.335 | — | 7.84 | 29.42 | 0.65 | 32.19 |

Cationic Graft Copolymer of Lignin. The applications of the anionic graft copolymers described above are many but the negative charge on the polymer or the behavior of the anionic polymer under application conditions often limit the utility of these materials. One solution to this problem is to create new copolymers of lignin which have the appropriate functional groups to perform effectively in a given environment. One such class of new materials with the right parts to function where anionics fail is the class of cationic polymers. Data from one such copolymer will now be presented. The Preparation of Lignin Graft Copolymer. Lignin has been reacted with 4N,4N-dimethyl-4-ammonium-hept-1,6-diene chloride monomer (DMDAC) to make a cationic graft copolymer. The structure of the copolymer is illustrated by the formula,

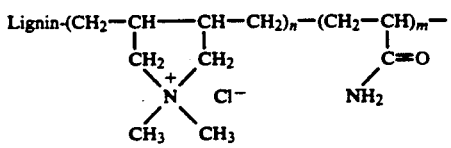

TABLE 2

Synthesis Data of Cationic Lignin Graft Copolymer
Poly(lignin-g-((1-amidoethylene)-r-(methylene
1N,1N-dimethyl-1-ammoniumcyclopenta-3,4-diyl
chloride methylene)))

| Sample (Example) Number | wt. in grams | | Reactant volume in mL | | | EDTA mmole | E | Cl | Reaction Parameter molar ratio | Cl/g | Cl/L | Cl/H | Yield % |
|---|---|---|---|---|---|---|---|---|---|---|---|---|---|
| | Lignin | CaCl$_2$ | A | B | DMSO | | | | | | | | |
| 24-37-1(29) | 0.66 | 0.33 | 2.35 | 1.03 | 29.28 | 1.30 | 0.65 | 12.34 | 83.8/16.2 | 0.35 | 18.70 | 2.26 | 68.43 |
| 24-37-2(30) | 0.65 | 0.33 | 2.25 | 1.25 | 28.23 | 1.50 | 0.65 | 13.59 | 80.4/19.6 | 0.39 | 20.91 | 2.49 | 68.43 |
| 24-37-3(31) | 0.66 | 0.33 | 2.07 | 1.55 | 28.82 | 1.90 | 0.65 | 15.69 | 75.4/24.6 | 0.43 | 23.77 | 2.88 | 51.37 |
| 24-37-4(32) | 0.66 | 0.33 | 1.93 | 1.88 | 33.25 | 2.30 | 0.65 | 17.61 | 70./30. | 0.43 | 26.68 | 3.23 | 49.61 |
| 24-37-5(33) | 0.68 | 0.34 | 2.69 | — | 25.26 | — | 0.65 | 6.13 | 100/0 | 0.21 | 9.01 | 1.12 | 95.37 |

A: 2-propenamide, B: DMDAC
E: 30% hydrogen peroxide (equivalent weight: 8.383 meq/ml)
The concentration of EDTANa2 is 200 ppm based on DMDAC
Cl/g: Chloride content per unit weight of total reaction mass (mmole/g)
Cl/L: Chloride content per unit weight of lignin (mmole/g)
Cl/H: Molar ratio of chloride to hydrogen peroxide and is the compound, poly(lignin-g-((1-amidoethylene)-co(methylene 1N,1N-dimethyl-1-ammoniumcyclopenta-3,4-diyl chloride methylene))), which will be referred to as copolymer 3. The composition, reaction conditions, and yield of copolymer 3 (24-37 series) are shown in Table 2. The content of 4N,4N-dimethyl-4-ammoniumhept-1,6-diene chloride in the reaction ranges from 0 to 30 molar percent of total monomer content. The concentration of lignin, calcium chloride, and monomer in the reaction are around 1.8, 0.9 and 9.5 percent by weight of total reaction mass respectively, as shown in Table 3. In the reaction listed in Table 2, the ratio of lignin to calcium chloride is 2 to 1 by weight. The yield of reaction ranges from 49.61 to 95.37 weight percent. By comparing yield to reaction chloride ion content, these results indicate that yield of reaction decreases when content of chloride ion (on a molar basis) increases. Simultaneously, however, the yield increases when content of 2-propenamide increases.

TABLE 3

The Composition of Reaction Mixture Used to Make Lignin Graft Copolymers (basis: weight percent of total mass)

| Sample* Number | Total Mass | Lignin Wt. % | CaCl$_2$ Wt. % | Monomer Wt % | Monomer mmole/g | Yield % | Ex. # of Prod. |
|---|---|---|---|---|---|---|---|
| (34) | 35.60 | 1.85 | 0.93 | 9.49 | 1.11 | 68.43 | 29 |
| (35) | 34.86 | 1.86 | 0.94 | 10.04 | 1.13 | 63.78 | 30 |
| (36) | 35.98 | 1.83 | 0.92 | 10.06 | 1.08 | 51.37 | 31 |
| (37) | 41.00 | 1.60 | 0.80 | 9.29 | 0.95 | 49.61 | 32 |
| (38) | 29.62 | 2.30 | 1.15 | 9.08 | 1.28 | 95.37 | 33 |

*Example number in parenthesis. All are 24-37.

Other cationic copolymers can be made using this chemistry. Two alternate cationic copolymers which differ from copolymer 3 in structure, stability, charge density, and molecular size have been made and will now be described. The monomers are: 2-methyl-N7,N7-dimethyl-7-ammonium-3-oxo-4-oxyoct-1-ene methyl sulfate and 2-methyl-N7,N7-dimethyl-7-ammonium-3-oxo- 4-oxyoct-1-ene chloride. These two monomers were used to make two cationic copolymers which will be referred to as copolymer 4 and copolymer 5, as defined in Table 4.

TABLE 4

Definitions of Labels for Cationic Copolymers

| Correct Chemical Name | Label |
|---|---|
| poly(lignin-g-((1-amidoethylene)-r-(1-methyl-1-(N5,N5-dimethyl-5-ammonium-1-oxo-2-oxyhexyl)ethylene methylsulfate))) | Copolymer 4 |
| poly(lignin-g-((1-amidoethylene)-r-(1-methyl-1-(N5,N5-dimethyl-5-ammonium-1-oxo-2-oxhexyl)ethylene chloride))) | Copolymer 5 |

For copolymer 5, the reaction composition, condition and yield are given in Table 5a. The monomer content of 2-methyl-N7,N7-trimethyl-7-ammonium-3-oxo-4-oxyoct-1-ene chloride ranges from 0 to 100 mole percent of total monomer content. The concentration of lignin, calcium chloride and monomer in the reactions are around 1.5, 0.8 and 15 percent by weight, respectively. The ratio of lignin to calcium chloride is 2 to 1 by weight. The same change in yield as a function of chloride ion content in the reaction mixture was seen when chloride ion content in these reactions increased, except when using water as co-solvent.

TABLE 5

Synthesis Data of Cationic Graft Copolymer-5

| Sample* Number | weight in gram | | | | | | Reactant E (mL) | Cl mmole | Reaction parameter Molar Ratio x/y | Cl/g | Cl/L | Cl/H | Yield % |
|---|---|---|---|---|---|---|---|---|---|---|---|---|---|
| | Lignin | CaCl$_2$ | A | C | DMSO | H$_2$O** | | | | | | | |
| 24-117 | | | | | | | | | Part A | | | | |
| (39) | 0.69 | 0.34 | 2.45 | — | 30.59 | — | 0.65 | 6.12 | 100./y | 0.18 | 8.87 | 1.12 | 89.65 |
| (40) | 0.67 | 0.34 | 2.63 | 0.83 | 30.46 | — | 0.65 | 10.12 | 90.2/y | 0.28 | 15.10 | 1.86 | 86.32 |
| (41) | 0.68 | 0.34 | 2.27 | 1.68 | 31.20 | — | 0.65 | 14.21 | 79.8/y | 0.39 | 20.90 | 2.61 | 83.43 |
| (20) | 0.68 | 0.34 | 1.70 | 3.33 | 47.85 | — | 0.65 | 22.16 | 59.9/y | 0.41 | 32.59 | 4.07 | 72.22 |

TABLE 5-continued

Synthesis Data of Cationic Graft Copolymer-5

| Sample* Number | weight in gram | | | Reactant | | | E (mL) | Cl mmole | Reaction parameter | | | | Yield % |
|---|---|---|---|---|---|---|---|---|---|---|---|---|---|
| | Lignin | CaCl$_2$ | A | C | DMSO | H$_2$O** | | | Molar Ratio x/y | Cl/g | Cl/L | Cl/H | |
| (21) | 0.67 | 0.34 | 1.12 | 4.93 | 62.89 | — | 0.65 | 29.87 | 39.9/y | 0.42 | 44.58 | 5.48 | 40.31 |
| (22) | 0.67 | 0.34 | 0.29 | 7.40 | 28.02 | 3.18 | 0.65 | 41.77 | 10.3/y | 1.04 | 62.34 | 7.67 | 93.27 |
| (23) | 0.68 | 0.34 | — | 8.21 | 26.67 | 3.55 | 0.65 | 45.67 | 0/y | 1.16 | 67.16 | 8.38 | 96.20 |
| Part B 24-136 | | | | | | | | | | | | | |
| (42) | 0.50 | 0.38 | 2.58 | 1.94 | 31.08 | — | 0.50 | 16.19 | 79.5/y | 0.44 | 32.38 | 3.86 | 91.60 |
| (43) | 0.50 | 0.26 | 2.25 | 2.82 | 34.82 | — | 0.50 | 18.27 | 70./y | 0.44 | 36.54 | 4.36 | 94.07 |
| (44) | 0.50 | 0.11 | 1.93 | 3.37 | 39.40 | — | 0.50 | 19.95 | 60.2/y | 0.43 | 39.90 | 4.76 | 91.23 |
| (45) | 0.50 | 0.01 | 1.61 | 4.67 | 45.31 | — | 0.50 | 22.68 | 50.2/y | 0.43 | 45.36 | 5.41 | 90.71 |

*Example number in parenthesis.
A = 2-propenamide;
C = 2-methyl-N7,N7-dimethyl-7-ammonium-3-oxo-4-oxyoct-1-ene chloride
E = 30% hydrogen peroxide (equivalent weight: 8.383 meq/mL)
**the water content is 3 weight percent of total solvent
Cl/g = chloride content per unit weight of reaction mass
Cl/L = chloride content per unit weight of lignin
Cl/H = molar ratio of chloride to hydrogen peroxide
y = 100 − x The incorporation of water in the solvent system significantly increases yield with yields of up to 90 weight percent common in the mixed solvent. In the mixed solvent reactions, however, these high yields are obtained when the chloride ion content of the reaction is well above the optimum ion content which will produce high yield in a reaction run in pure DMSO. This boost in yield could be due to the increased solubility of monomer and copolymer in the mixed solvent, since water is the best solvent for both monomer and cationic polyelectrolyte. The result of above experiments clearly indicates that yield of graft copolymerization is highly dependent upon reaction content of chloride ion and solvent. The chloride ion for these reactions comes from either calcium chloride or counter ion from chloride-containing monomers. Both sources of chloride ion must be considered in designing a synthesis for maximum yield.

In order to distinguish the chloride ion effect between calcium chloride and chloride counter ion, the lignin-(2-propenamide)-(2-methyl-N7,N7-dimethyl-7-ammonium-3-oxo-4-oxyoct -1-ene chloride) reaction to make copolymer 5, (24-136 series), was run at constant chloride ion content. The reaction composition, condition and yield are given in Table 5b. Note that the amount of calcium chloride decreases when amount of 2-methyl-N7,N7-trimethyl-7-ammonium-3-oxo-4-oxyoct-1-ene chloride increases and the total chloride ion content in these reactions is kept at 0.4 mmole per unit weight of reaction mass, which is equal to the chloride concentration when calcium chloride is 2.41 weight percent of total reaction mass. The yield increases at least 10 percent under these conditions. The data of Table 5b show that yield is scattered between 90 and 95 weight percent for all of the optimum chloride content reactions which puts yield at optimum chloride content in the same range as that obtained from the two reactions of Table 5a that contain water. The above result apparently indicates that the chloride ion content is a critical parameter in controlling yield of lignin graft copolymer and that the optimum chloride content which maximizes yield must be determined experimentally for each grafting reaction. Further, chloride counter ion from N,4N-dimethyl-4-ammonium hept-1,6-diene chloride and 2-methylN,7N-dimethyl-7-ammonium-3-oxo-4-oxyoct-1-ene chloride also has the same effect on the yield as calcium chloride salt added to the reaction.

Two syntheses were run to test the effect of the cation, contained in the halide salt, on yield and product properties.

Example 46

A total of 0.5038 g of steam explosion, aspen lignin and 1.5840 g of potassium bromide were placed in a 150 mL beaker containing 16.0 mL of dimethylsulfoxide. The potassium bromide was ground into a powder before use. The mixture was stirred and bubbled with nitrogen (N$_2$) for about 10 minutes before 0.80 mL of hydrogen peroxide were added to the reaction mixture. N$_2$ was bubbled through the reaction mixture for 8 minutes before 2.8818 g of 2-propenamide (40.52 mmole) in 11.5 mL of dimethylsulfoxide, which has been stirred together and nitrogensaturated for about 10 minutes, were then added. After about 10 minutes of stirring and N$_2$ bubbling, the flask was stoppered and placed in a 30° bath for 2 days. The bromide content of the reaction mixture was 2.90 weight percent. The solids content of the reaction mixture was 13.56 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of the dialysis was a clear brown solution. The dilute reaction product from the dialysis tube was recovered by freeze drying and found to weight 1.79 g. The product was labeled 27-49-1. Yield = 52.87 weight percent.

Example 47

A total of 0.5019 g of steam explosion, aspen lignin and 1.4094 g of sodium bromide were placed in a 150 mL beaker containing 16.0 mL of dimethylsulfoxide. The mixture was stirred and bubbled with nitrogen (N$_2$) for about 10 minutes before 0.80 mL of hydrogen peroxide were added to the reaction mixture. N$_2$ was bubbled through the reaction mixture for 8 minutes before 4.3102 g of 2-propenamide (40.52 mmole) in 11.5 mL of dimethylsulfoxide, which had been stirred together and nitrogensaturated for about 10 minutes, were then added. After about 10 minutes of stirring and N$_2$ bubbling, the flask was stoppered and placed in a 30° C bath for 2 days. The bromide content of the reaction mixture was 2.93 weight percent. The solids content of the reaction mixture was 16.63 weight percent. The reaction was then terminated by adding 1.0 mL of 1% hydroquinone and 100 mL of water thereto. The aqueous solution is dialyzed against pure water using a 3,500-upper-molecular-weight-permeable, dialysis membrane for 3 days. The product of this dialysis was a clear brown solution. The dilute reaction product from the dialysis tube was recovered by freeze drying and found to weight 1.25 g. The product was labeled 27-49-2. Yield =25.98 weight percent.

Examples 46 and 47 show that the cation associated with the halide ion can influence the results of the reaction. In this case, the potassium neutralized salt produced a larger yield from the polymerization than did the sodium salt. Choice of both anion and cation in the halide salt must be controlled to produce desired yields and product properties from the grafting reaction.

Reactions 48 to 53 of Table 6 were identical composition tests run for different amounts of time. The product of the reactions of Table 6 are poly(lignin-(2-propenamide)(sodium 2,2-dimethyl-3-imino-4-oxohex-5-ene-1-sulfonate)) and is referred to as copolymer 2. Sample 48 was terminated after 31 minutes, sample 49 after 1 hour, samples 52 and 53 after 3 hours, sample 51 after 24 hours, and sample 50 after 48 hours. This data was gathered to determine the minimum duration of the reaction. The results show that high yields (samples 48 and 53) can be obtained in reaction times as short as 30 minutes. Several samples (49 and 51) show low yields after reaction times as long as 3 hours but these results were obtained from a contaminated reaction and a reaction containing less than the appropriate amount of solvent, respectively.

TABLE 6

Synthesis Data and Physical Characteristics of Graft Terpolymer[a]

| Sample Number | Part A Reactants | | | | | | Part B | | | | | | |
|---|---|---|---|---|---|---|---|---|---|---|---|---|---|
| | 2-propen amide (g) | A (g) | Ce(4+) solution (mL) | Dimethyl sulfoxide (mL) | CaCl₂ (g) | B (mL) | Yield (wt %) | [N] (dL/g) | Assays (wt %) C | H | N | S | Repeat Units (wt %) 1-amido-ethylene | D |
| 48 | 2.56 | 1.86 | 0.15 | 20 | 0.50 | 0.36 | 80.69 | — | 44.38 | 6.83 | 10.84 | 4.79 | 44.39 | 34.2 |
| 49 | 2.56 | 1.86 | 0.15 | 20 | 0.50 | 0.343 | 15.64 | — | 44.73 | 6.46 | 9.62 | 4.70 | 38.40 | 33.6 |
| 50 | 2.57 | 1.87 | 0.15 | 20 | 0.50 | 0.34 | 69.89 | — | 43.88 | 6.58 | 10.82 | 4.32 | 45.33 | 30.9 |
| 51 | 2.56 | 1.87 | 0.15 | 20 | 0.50 | 0.34 | 66.79 | — | 44.90 | 6.82 | 10.73 | 4.69 | 44.05 | 33.5 |
| 52 | 2.57 | 1.76 | 0.20 | 15 | 0.50 | 0.34 | 18.50 | — | 42.80 | 6.74 | 11.41 | 4.75 | 47.37 | 34.0 |
| 53 | 2.57 | 1.86 | 0.15 | 20 | 0.50 | 0.34 | 45.06 | — | | | | | | |

[a]All reactions contained 0.50 g of lignin.
A) = 2,2-dimethyl-3-imino-4-oxohex-5-ene-1-sulfonic acid.
B) = Hydroperoxide. Samples 48 to 53: Values are amount of aqueous solution of 1,2-dioxy-3,3-dimethylbutane in mL. Equivalent/mL = 7.23 × 10⁻³.
D) = N = substituted 1-amidoethylene.
The results contained in Table 6 show that yields of 80 weight percent or more are possible in reactions run for times as short as 1 hour.

TABLE 7

Synthesis Data and Physical Characteristics of Graft Terpolymer[a]

| Sample Number | Reactants | | | | | | Part B | | | | | | |
|---|---|---|---|---|---|---|---|---|---|---|---|---|---|
| | 2-propen amide (g) | A (g) | Ce(4+) solution (mL) | Dimethyl sulfoxide (mL) | CaCl₂ (g) | B (g) | Yield (wt %) | [N] (dL/g) | Assays (wt %) C | H | N | S | Repeat Units (wt %) 1-amido-ethylene | D |
| 54 | 1.60 | 4.66 | 0.15 | 20 | 0.50 | 0.15 | 70.12 | 10.52 | 35.41 | 5.94 | 7.03 | 9.78 | 14.1 | 62.6 |
| 55 | 1.60 | 4.66 | 0.15 | 50 | 0.50 | 0.15 | 86.98 | 11.40 | 36.77 | 6.17 | 8.39 | 9.54 | 21.51 | 61.1 |
| 56 | 1.60 | 4.66 | 0.15 | 50 | 0.50 | 0.25 | 78.40 | 7.40 | 36.88 | 6.20 | 8.49 | 9.19 | 22.79 | 58.8 |
| 57 | 1.60 | 4.66 | 0.15 | 40 | 0.50 | 0.40 | 69.82 | 9.30 | 37.74 | 6.39 | 8.47 | 9.23 | 22.60 | 59.1 |
| 58 | 1.60 | 5.16 | 0.15 | 30 | 0.50 | 0.15 | 78.79 | 12.59 | 39.85 | 6.79 | 9.39 | 8.61 | 28.63 | 55.1 |
| 59 | 1.60 | 5.16 | 0.15 | 30 | 0.50 | 0.15 | 77.27 | 6.81 | 38.03 | 6.40 | 8.73 | 9.95 | 22.33 | 63.7 |
| 60 | 1.60 | 4.66 | 0.15 | 30 | 0.50 | 0.15 | 87.74 | 10.46 | 36.51 | 6.33 | 7.74 | 10.29 | 16.56 | 65.9 |
| 61 | 2.58 | 1.87 | 0.15 | 30 | 0.50 | 0.39 | 67.89 | .953 | 43.31 | 6.65 | 10.92 | 5.65 | 42.89 | 40.4 |
| 62 | 2.56 | 1.86 | 0.15 | 30 | 0.53 | 0.39 | 79.49 | 2.46 | 42.47 | 6.29 | 10.76 | 5.66 | 42.1 | 36.2 |
| 63 | 21.98 | 15.99 | 1.28 | 219 | 4.35 | 3.35 | 91.02 | 1.97 | 42.25 | 6.49 | 11.34 | 6.21 | 43.78 | 44.4 |
| 64 | 2.56 | 1.86 | 0.15 | 20 | 0.50 | 0.36 | 80.69 | — | 44.38 | 6.83 | 10.84 | 4.79 | 44.39 | 34.2 |
| 65 | 2.56 | 1.86 | 0.15 | 20 | 0.50 | 0.343 | 15.64 | — | 44.73 | 6.46 | 9.62 | 4.70 | 38.40 | 33.6 |
| 66 | 2.57 | 1.87 | 0.15 | 20 | 0.50 | 0.34 | 69.89 | — | 43.88 | 6.58 | 10.82 | 4.32 | 45.33 | 30.9 |
| 67 | 2.56 | 1.87 | 0.15 | 20 | 0.50 | 0.34 | 66.79 | — | 44.90 | 6.82 | 10.73 | 4.69 | 44.05 | 33.5 |
| 68 | 2.57 | 1.76 | 0.20 | 15 | 0.50 | 0.34 | 18.50 | — | 42.80 | 6.74 | 11.41 | 4.75 | 47.37 | 34.0 |
| 69 | 2.57 | 1.86 | 0.15 | 20 | 0.50 | 0.34 | 45.06 | — | | | | | FeCl₂4H₂O g | moles × 10⁵ |
| 70 | 2.57 | 1.86 | 0.14 | 30 | 0.50 | 0.34 | 70.28 | | 42.72 | 6.79 | 10.60 | | 0 | 0 |
| 71 | 2.56 | 1.87 | 0.15 | 20 | 0.50 | 0.335 | 51.63 # | | 42.55 | 7.40 | 11.32 | | 1.5 × 10⁻³ | .754 |
| 72 | 2.56 | 1.86 | 0.15 | 20 | 0.50 | 0.338 | 72.72 | | 44.36 | 6.89 | 9.91 | | 1.87 × 10⁻² | 9.41 |
| 73 | 2.56 | 1.87 | 0.15 | 20 | 0.51 | 0.34 | 18.26 | | 42.66 | 6.50 | 9.25 | | .184 | 9.26 |
| 74 | 2.56 | 1.87 | 0.15 | 20 | 0.50 | 0.34 | 68.29 | | 41.77 | 6.67 | 10.78 | | 0 | 0 |
| 75 | 2.57 | 1.86 | 0.26 | 20 | 0.50 | 0.34 | 71.27 | | 42.84 | 6.50 | 10.76 | | 1.55 × 10⁻³ | .780 |

# = some product lost during purification.
[a]All reactions, save #63, contained 0.50 of lignin. Reaction #63 contained 4.39 g of lignin.
A) 2,2-dimethyl-3-imino-4-oxohex-5-ene-1-sulfonic acid
B) Hydroperoxide. Samples 54 to 60: Values are weight of 1,4-dioxa-2-hydroperoxycycloexane in g. Samples 61 to 75: Values are amount of aqueous solution of 1,2-dioxy-3,3-dimethylbutane in mL. Equivalent/mL = 7.23 × 10⁻³.
D) N-substituted 1-amidoethylene.

The data of Table 7 shows that the graft copolymerization can be run in many solvents. The data also show that hydroperoxides such as 1,4-dioxa-2-hydroperoxycyclohexane will produce graft copolymers. Further, as shown, the composition of the reaction and the lignin and monomer content of the final product can be varied extensively.

chemistry. The following examples show that wood can be used in the place of lignin during these reactions.

Example 91

A total of 0.69 g of mechanical pulp and 0.68 g of sodium chloride were placed in a 125 mL conical flask containing 25.09 g of dimethylsulfoxide. The mixture

TABLE 8

Graft Copolymerization Reactions Run Using tert-Butyl Hydroperoxide (TBHP) as Initiator

| Product Number | TBHP[a] | | Ce(IV) | | yield | | composition, wt % | |
|---|---|---|---|---|---|---|---|---|
| | g | mol × $10^3$ | g × $10^3$ | mol × $10^5$ | g | wt % | lignin | 1-amidoethylene |
| 76 | 0.254 | 2.82 | 1.05 | 0.75 | 2.37 | 64.1 | 13.9 | 70.9 |
| 77 | 0.508 | 5.64 | 1.05 | 0.75 | 2.70 | 73.0 | 9.26 | 70.8 |
| 78 | 0.135 | 1.50 | 1.05 | 0.75 | 2.70 | 73.0 | 9.54 | 68.6 |
| 79 | 0.254 | 2.82 | 3.15 | 2.25 | 2.71 | 73.2 | 8.29 | 71.0 |
| 80 | 0.254 | 2.82 | 5.25 | 3.75 | 2.16 | 58.4 | 9.76 | 68.9 |
| 81 | 0.254 | 2.82 | 0.21 | 0.15 | 2.36 | 63.8 | 7.88 | 68.1 |
| 82 | 0.508 | 5.64 | 3.15 | 2.25 | 2.3 | 62.2 | | |
| 83 | 0 | 0 | 1.05 | 0.75 | 0 | 0 | | |

[a]All reactions save no. 80 contained 0.5 g of lignin, 3.2 g of 2-propenamide, and 0.5 g of calcium chloride in 20 mL of distilled 1,4-dioxane. Reaction 80 was similar to the other reactions but contained only 0.2 g of calcium chloride. The correct name of TBHP is 1,2-dioxo-3,3-dimethylbutane.

TABLE 9

Results of Syntheses[a] Run in Different Solvents

| sample | solvent | yield (g) | reaction product composition, wt % | | | | limiting viscosity number (dL/g) |
|---|---|---|---|---|---|---|---|
| | | | lignin | 1-amido-ethylene | Ca | Cl | |
| 84 | 1-methyl-2-pyrrolidinone | 4.4 | 4.74 | 75.36 | 3.11 | 2.85 | 14.2 |
| 85 | dimethylsulfoxide | 4.71 | 6.5 | 76.73 | 2.79 | 2.07 | 32.2 |
| 86 | dimethylacetamide | 4.13 | 5.61 | 57.43 | 2.77 | 1.85 | 27.6 |
| 87 | dimethylformamide | 4.25 | 7.18 | 73.75 | 2.82 | 1.90 | 32 |
| 88 | dimethyl sulfoxide, dioxane (50:50, v/v) | 4.19 | 5.13 | 72.14 | | | 53 |
| 89 | dimethyl sulfoxide, water (50:50, v/v) | 4.28 | 6.27 | 71.52 | | | 66 |
| 90 | pyridine | 4.00 | 5.42 | 71.67 | | | 47 |

[a]Each reaction contained 0.50 g of lignin, 3.2 g of 2-propenamide, 0.4 of 1,4-dioxane autooxidation product, 0.15 mL ceric sulfate solution, and 20.0 mL of solvent.

TABLE 10

Results of Syntheses[a] Run in Different Solvents

| sample | solvent | precipitation test | | | |
|---|---|---|---|---|---|
| | | weight of reaction product used, g | weight of solids recovered, g | weight % insolubles in $H_2O$ | phases in reacted mixture |
| 84 | 1-methyl-2-pyrrolidinone | 0.20075 | 0.002 | 1.0 | precipitate |
| 85 | dimethylsulfoxide | 0.20065 | 0.001 | 0.5 | gelled soln |
| 86 | dimethylacetamide | 0.20065 | 0.0018 | 0.9 | precipitate |
| 87 | dimethylformamide | 0.20015 | 0.0023 | 1.1 | precipitate |
| 88 | dimethyl sulfoxide, dioxane (50:50, v/v) | 0.2005 | 0.00175 | 0.9 | precipitate |
| 89 | dimethyl sulfoxide, water (50:50, v/v) | 0.2005 | 0.00585 | 2.9 | 2 fluid-phase sample, gelled-bottom layer |
| 90 | pyridine | 0.2001 | 0.001 | 0.5 | precipitate |

[a]Each reaction contained 0.50 g of lignin, 3.2 g of 2-propenamide, 0.4 of 1,4-dioxane autooxidation product, 0.15 mL ceric sulfate solution, and 20.0 mL of solvent.

The data of Table 8 shows that the grafting reaction can be run with 1,2-dioxo-3,3-dimethylbutane as the hydroperoxide. Further, these data show that the hydroperoxide is critical to the reaction. Without it, the synthesis does not occur. Tables 9 and 10 show that the reaction can be run in a host of solvents. These data also show that the solvent influences the properties of the product.

Lignin also exists on the surface of all forms of wood. This suggests that wood should be reactable with this was stir-bubbled with nitrogen ($N_2$) for about 2 minutes before 0.482 mL of 30 percent, aqueous hydrogen peroxide were added to the reaction mixture. $N_2$ was bubbled through the reaction mixture for about 2 more minutes and 3.23 g of 2-propenamide (1) in 10.29 g of dimethylsulfoxide was then added. The flask was stoppered and placed in a 30° C. bath for 2 days. The reaction was then terminated by adding 0.5 mL of 1% hydroquinone and 100 mL of water thereto. The stirred reaction mixture was separated from solids by filtration. The recovered solid and filtrate were dialyzed against pure water for 3 days. The solid and fluid phases from the reaction were recovered by freeze drying. The solid was found to weigh 0.61 g. The product was labeled 30-57-1. Yield=(weight, solids recovered)/(weight, wood)=88.41 weight percent. The nitrogen content of the product was 0.45 weight percent. This means that the 1-amidoethylene content of the recovered pulp was 2.29 weight percent.

TABLE 11

Synthesis Data and Physical Characteristics of Reacted Wood

| Sample Number | Reactants | | | | | Yield (g) (wt %) | Nitrogen/ Monomer Content (N %/Mo %) |
|---|---|---|---|---|---|---|---|
| | 2-propen amide (g) | Pulp (g) | H₂O₂ (g) | Dimethyl Sulfoxide (g) | NaCL (g) | | |
| 92 | 3.20 | 1.01 | 0.482 | 35.38 | 0.68 | 1.00/99.0 | 0.39/1.99 |
| 93 | 3.20 | 0.70 | 0.482 | 21.28 | 0.69 | 0.67/97.1 | 0.64/3.26 |
| 94 | 3.21 | 0.70 | — | 21.30 | 0.69 | 0.66/94.3 | 0.00/0.00 |

Example 94 contains no hydrogen peroxide and shows that no addition of monomer to the wood occurs in the absence of the reagents needed to run the reaction. Examples 91 to 93 show that the reaction does attach vinyl monomers to wood.

Example 95

A total of 1.00 g of mechanical pulp and 0.68 g of sodium chloride were placed in a 125 mL conical flask containing 25.0 mL of water. The mixture was stir-bubbled with nitrogen (N₂) for about 2 minutes before 0.50 mL of 30 percent, aqueous hydrogen peroxide were added to the reaction mixture. N₂ was bubbled through the reaction mixture for about 2 more minutes and 3.20 g of 2-propenamide (1) in 10.0 mL of water was then added. The flask was stoppered and placed in a 30° C. bath for 2 days. The reaction was then terminated by adding 1.0 mL of 1% hydroquinone. The reaction product was gelled but also contained solids. It was dialyzed against pure water for 3 days. The dialysis mixture was filtered and the fluid was dehydrated by freeze drying. The solid filtered from the dialysis was found to weigh 1.1 g and to contain 2.72 weight percent nitrogen. This means that the 1-amidoethylene content of the recovered pulp was 13.88 weight percent. The solid product was labeled 30-30-1, residue part. Yield=(weight, solids recovered)/(weight, wood+monomer)=26.2 weight percent. The solid from the dialysis flud was found to weight 2.2 g and to contain 16.80 weight percent nitrogen. This is 85.64 weight percent sidechain. The solid product was labeled 30-30-2, filtrate part. Yield=(-weight, solids recovered)/(weight, wood+-monomer)=52.4 weight percent.

Example 95 shows that several solvents can be used to attach large amounts of sidechain to wood using this chemistry. The molecular weight of the lignin copolymers of the present invention is in the range of about 40,000 to about 30,000,000 as determined by size exclusion chromatography using known techniques. Under the process conditions of the present invention already described, it is possible to obtain molecular weights of about 15,000 to 300,000. Under these conditions, the polymer molecular weight is generally increased by increasing the ratio of moles of monomer to moles of hydroperoxide. The converse is true when diminishing the molecular weight. However, by utilizing another aspect of the present invention, it has now been found possible to greatly boost or increase the molecular weight of the growing polymer during polymerization by conducting the reaction essentially in a gelated state.

Generally, the gelated state can be formed by essentially repeating the procedures already described for synthesizing the graft copolymer, but by reducing the amount of dimethylsulfoxide (DMSO) solvent by a factor of 0.25 or more. In other words, instead of using about 30 mL of solvent for the reaction as described in the Examples, about 23 or less mL are used instead. It has been theorized that by conducting the polymerization reaction in the gelated state, the propagation reaction continues, while the termination reaction is greatly diminished. It is also possible that the higher concentration of backbone and repeat units allows crosslinking in these lower solvent content reactions. In general, the gelation occurs at room temperature with no heating being necessary. Reaction times are somewhat variable and on the order of from 1 to about 48 hours with reaction yields as high as 80 weight percent possible in about 1 hour.

Although the polymerization reaction of the present invention is a free-radical polymerization, the scope of the present invention clearly extends the concept of gel-state reactions to other types of polymerization reactions such as anionic or cationic chain polymerications or step polymerizations.

Having now fully described the invented process, it will be apparent to one or ordinary skill in the art that many changes and modifications can be made thereto without departing from the spirit and scope of the invention as set forth herein.

I claim:

1. A method of preparing a copolymer of a lignin containing material, the lignin containing material consisting essentially of at least one of wood, wood fiber, and wood pulp comprising:
   a) selecting a lignin containing material consisting essentially of at least one wood, wood fiber and wood pump;
   b. providing an oxygen free environment; and
   c) forming a reaction mixture comprising said lignin containing material, a redox initiator, a halide salt and at least one monomer selected from the group consisting of:

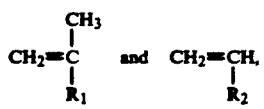

wherein R₁ and R₂ are organic functional groups which do not interfere with polymerization.

2. The method as set forth in claim 1 wherein said halide salt is selected from the group consisting of chloride, bromide and fluoride salts.

3. The method as set forth in claim 1 wherein said polymerization is conducted in the presence of a solvent in said reaction mixture.

4. The method as set forth in claim 3 wherein said solvent comprises at least one selected from the group consisting of dimethyl sulfoxide, dimethyl acetamide, dimethyl formaide, 1,4-dioxane, 1-methyl-2-pyrolidianone, pyridine and water.

5. The method as set forth in claim 1 wherein said redox initiator is a hydroperoxide.

6. The method of claim 5 wherein said hydroperoxide is selected from the group consisting of hydrogen peroxide, sodium peroxyborate, magnesium peroxyphthalate, sodium percarbonate, and 2-hydroperoxy-1,4-dioxycyclohexane.

7. The method as set forth in claim 5 wherein said halide salt and said hydroperoxide are redox initiators.

8. The method as set forth in claim 1 wherein said polymerization is terminated by adding a free radical scavenger.

9. The method as set forth in claim 8 where said free radical scavenger is hydroquinone.

10. The method as set forth in claim 1 wherein said step of providing an oxygen free environment comprises bubbling nitrogen through said reaction mixture.

11. The method as set forth in claim 1 wherein said lignin is selected from the group consisting of a steam exploded wood extract, kraft pine lignin and yellow polar lignin.

12. The method as set forth in claim 1 and conducted at room temperature.

13. The method as set forth in claim 3 wherein said step of providing an oxygen free environment comprises bubbling nitrogen through said reaction mixture.

14. A method according to claim 1, wherein such at least one monomer consists of first and second monomers, the first monomer being 2-propenamide and the second monomer being 2-methyl-N7,N7-dimethyl-7-ammonium-3-oxo-4-oxyoct-1-ene chloride.

15. A method according to claim 1, wherein such at least one monomer consists of first and second monomers, the first monomer being 2-propenamide and the second monomer being 2,2-dimethyl-3-imino-4-oxohex-5-ene-1-sulfonic acid.

16. A method according to claim 1, wherein such at least one monomer consists of first and second monomers, the first monomer being 2-propenamide and the second monomer being dimethyldiprop-2-enylammonium chloride, methylsulfate, bicarbonate, or bromide.

17. A graft copolymer of a lignin containing material, the lignin containing material consisting essentially of at least one of wood, wood fiber and wood pulp, said graft copolymer produced in a process comprising forming a reaction mixture in an oxygen free environment said reaction mixture comprising said lignin containing material, a redox initiator, a halide salt and at least one monomer selected from the group consisting of:

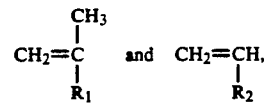

wherein $R_1$ and $R_2$ are organic functional groups which do not interfere with polymerization.

18. The graft copolymer of lignin of claim 17 produced in a process wherein said reaction mixture comprises a solvent and said polymerization is terminated by adding a free radical scavenger.

19. The graft copolymer of lignin of claim 17 wherein said halide salt is selected from the group consisting of chloride, bromide and fluoride salts.

20. The graft copolymer of lignin of claim 17 wherein said redox initiator is a hydroperoxide selected from the group consisting of hydrogen peroxide, sodium peroxyborate, magnesium peroxyphthalate, sodium percarbonate, and 2-hydroperoxy-1,4-dioxycyclohexane.

21. The graft copolymer of lignin of claim 17 wherein said solvent comprises at least one selected from the group consisting of dimethyl sulfoxide, dimethyl acetamide, dimethyl formamide, 1,4-dioxane, 1-methyl-2-pyrolidianone, pyridine and water.

22. The graft copolymer of lignin of claim 17 wherein said oxygen free environment comprises nitrogen.

23. The graft copolymer of lignin of claim 17 wherein said lignin is selected from the group of a stream exploded wood extract, kraft pine lignin and yellow polar lignin.

24. A graft copolymer according to claim 14, wherein such at least one monomer consists of first and second monomers, the first monomer being 2-propenamide and the second monomer being 2-methyl-N7,N7-dimethyl-7-ammonium-3-oxo-4-oxyoct-1-ene chloride, methylsulfate, bicarbonate, or bromide.

25. A graft copolymer according to claim 14, wherein such at least one monomer consists of first and second monomers, the first monomer being 2-propenamide and the second monomer being 2,2-dimethyl-3-imino-4-oxohex-5-ene-1-sulfonic acid.

26. A graft copolymer according to claim 14, wherein such at least one monomer consists of first and second monomers, the first monomer being 2-propenamide and the second monomer being dimethyldiprop-2-enylammonium chloride, methylsulfate, bicarbonate, or bromide.

* * * * *